United States Patent
Yamaguchi et al.

(10) Patent No.: US 9,835,774 B2
(45) Date of Patent: Dec. 5, 2017

(54) HEAD-UP DISPLAY DEVICE

(71) Applicant: DENSO CORPORATION, Kariya, Aichi-pref. (JP)

(72) Inventors: Masayuki Yamaguchi, Kariya (JP); Takayuki Fujikawa, Kariya (JP); Hiroshi Ando, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 75 days.

(21) Appl. No.: 14/906,275

(22) PCT Filed: Jul. 22, 2014

(86) PCT No.: PCT/JP2014/003839
§ 371 (c)(1),
(2) Date: Jan. 20, 2016

(87) PCT Pub. No.: WO2015/011913
PCT Pub. Date: Jan. 29, 2015

(65) Prior Publication Data
US 2016/0170099 A1 Jun. 16, 2016

(30) Foreign Application Priority Data
Jul. 24, 2013 (JP) ................................ 2013-153901

(51) Int. Cl.
*G03B 21/20* (2006.01)
*G02B 5/02* (2006.01)
(Continued)

(52) U.S. Cl.
CPC ............ *G02B 5/0263* (2013.01); *B60K 35/00* (2013.01); *B60R 1/00* (2013.01); *G02B 5/02* (2013.01);
(Continued)

(58) Field of Classification Search
CPC .............. G03B 21/208; G03B 21/2013; G03B 21/2033; G02B 5/0263; G02B 5/02;
(Continued)

(56) References Cited

U.S. PATENT DOCUMENTS

2009/0135374 A1   5/2009   Horiuchi et al.
2010/0053565 A1   3/2010   Mizushima et al.
(Continued)

FOREIGN PATENT DOCUMENTS

JP   H07270711 A   10/1995
JP   2003-035808 A   2/2003
(Continued)

OTHER PUBLICATIONS

International Search Report and Written Opinion (in Japanese with English Translation) for PCT/JP2014/003839, mailed Aug. 19, 2014; ISA/JP.

*Primary Examiner* — Ryan Howard
(74) *Attorney, Agent, or Firm* — Harness, Dickey & Pierce, P.L.C.

(57) ABSTRACT

Each of a plurality of optical elements that are arrayed in a lattice pattern in a screen member which diffuses a laser beam incident from a projector to guide the laser beam toward a projection surface has a curved surface on a side thereof, and the curved surface has a common convexly curved shape, and diffuses the laser beam which is emitted from the curved surface toward the projection surface. The respective optical elements include a plurality of reference elements which serve as a reference and a plurality of peripheral elements which are adjacent to the respective reference elements. The respective reference elements and the respective adjacent peripheral elements are formed by offsetting surface vertexes of the curved surfaces in a stepwise manner. Offset amounts generated between the (Continued)

respective reference elements and the respective adjacent peripheral elements are different from each other.

7 Claims, 20 Drawing Sheets

(51) Int. Cl.
    *G02B 27/01* (2006.01)
    *B60K 35/00* (2006.01)
    *G02B 5/18* (2006.01)
    *H04N 9/31* (2006.01)
    *B60R 1/00* (2006.01)
    *G02B 26/10* (2006.01)

(52) U.S. Cl.
    CPC ....... *G02B 5/1861* (2013.01); *G02B 27/0101* (2013.01); *G03B 21/2013* (2013.01); *G03B 21/2033* (2013.01); *H04N 9/3129* (2013.01); *B60R 2300/205* (2013.01); *G02B 26/105* (2013.01); *G02B 2027/0118* (2013.01)

(58) Field of Classification Search
    CPC ................ G02B 5/0215; G02B 5/1861; G02B 27/0101; H04N 9/3129
    See application file for complete search history.

(56) References Cited

U.S. PATENT DOCUMENTS

| | | |
|---|---|---|
| 2010/0259818 A1 | 10/2010 | Mikoshiba |
| 2012/0218641 A1 | 8/2012 | Kikuchi et al. |
| 2013/0050655 A1 | 2/2013 | Fujikawa et al. |
| 2013/0094092 A1 | 4/2013 | Imahori et al. |
| 2016/0085084 A1* | 3/2016 | Masson ............... G02B 5/0215 359/633 |

FOREIGN PATENT DOCUMENTS

| | | |
|---|---|---|
| JP | 2009128659 A | 6/2009 |
| JP | 2010145746 A | 7/2010 |
| JP | 2012163613 A | 8/2012 |
| JP | 2013064985 A | 4/2013 |
| JP | 2013088521 A | 5/2013 |
| WO | WO-2008114502 A1 | 9/2008 |
| WO | WO-2012117495 A1 | 9/2012 |

* cited by examiner

FIG. 15

(a) $\dfrac{\text{32A-32B (P1), 32B-32A}}{\delta 1 = \{(8jp+1)/16\} \cdot \lambda + \varepsilon 1}$ 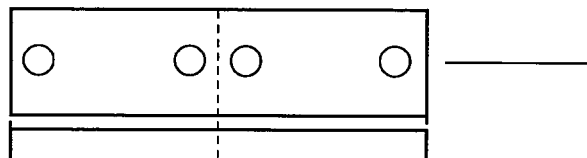

(b) $\dfrac{\text{32A-32C (P2), 32C-32A}}{\delta 2 = (k/8) \cdot \lambda + \varepsilon 2}$ 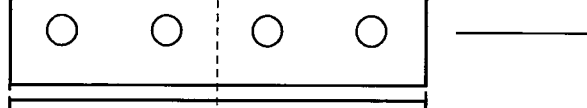

(c) $\dfrac{\text{32A-32D (P3), 32D-32A}}{\delta 3 = \{(8lp+3)/16\} \cdot \lambda + \varepsilon 3}$ 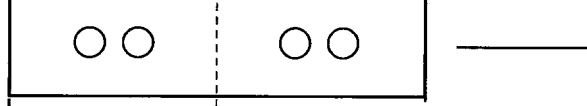

(d) $\dfrac{\text{32A-32E (P4), 32E-32A}}{\delta 4 = (m/4) \cdot \lambda + \varepsilon 4}$ 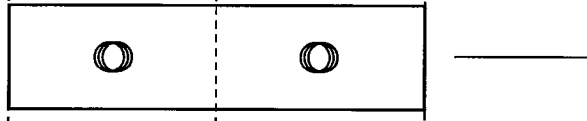

(e) $\dfrac{\text{32A-32F (P5), 32F-32A}}{\delta 5 = (n/2) \cdot \lambda + \varepsilon 5}$ 

(f) SUPERIMPOSITION 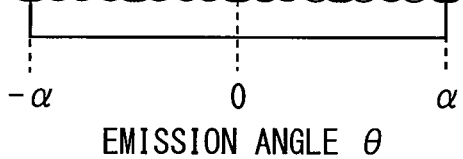

EMISSION ANGLE $\theta$

HEAD-UP DISPLAY DEVICE

CROSS-REFERENCE TO RELATED APPLICATIONS

This application is a U.S. National Phase Application under 35 U.S.C. 371 of International Application No. PCT/JP2014/003839 filed on Jul. 22, 2014 and published in Japanese as WO 2015/011913 A1 on Jan. 29, 2015. This application is based on and claims the benefit of priority from Japanese patent application No. 2013-153901 filed on Jul. 24, 2013. The entire disclosures of all of the above applications are incorporated herein by reference.

TECHNICAL FIELD

This disclosure relates to a head-up display device which displays a virtual image of a display image to be visible from an interior of a moving body such as vehicles by projecting the display image onto a projection surface of the moving body.

BACKGROUND ART

In the related art, a head-up display device (hereinafter, referred to as a "HUD device") is known as a device which practically displays a virtual image of a display image by causing a screen member to diffuse a laser beam configuring the display image and to guide the laser beam toward a projection surface.

For example, a HUD device disclosed in Patent Literature 1 causes multiple optical elements in a latticed array to diffuse a laser beam which is projected from a projector and which is incident on a screen member. The laser beam which is diffused and projected on a projection surface in this way is viewed as a virtual image of a display image by a viewer located inside an interior of a moving body.

PRIOR ART LITERATURE

Patent Literature

Patent Literature 1: JP 2009-128659 A

SUMMARY OF THE INVENTION

According to the present inventor's studies, if a laser beam having high coherence properties is diffused after being incident on an optical element pattern having regularity obtained by a latticed array, an irregularity occurs in luminance felt by a viewer who views the laser beam as a virtual image.

This disclosure is made in view of this point, and an object thereof is to provide a HUD device which suppresses occurrence of a luminance irregularity.

In an aspect of the present disclosure, a head-up display device displays a virtual image of a display image to be visible from an interior of a moving body by projecting the display image onto a projection surface of the moving body, the device including: a projector that projects a laser beam of the display image; and a screen member that includes a plurality of optical elements arrayed in a lattice pattern, the screen member guiding the laser beam toward the projection surface by diffusing the laser beam incident on the optical elements from the projector, wherein each of the plurality of optical elements has a curved surface on one side thereof, the curved surface having a common curved shape of one of a convex curve and a concave curve, the curved surface diffusing the laser beam emitted from the curved surface toward the projection surface, the plurality of optical elements includes a plurality of reference elements that serve as a reference and a plurality of peripheral elements adjacent to the plurality of reference elements, the curved surface of each of the plurality of reference elements has a surface vertex that is offset from a surface vertex of each of the adjacent plurality of peripheral elements, and each of the plurality of reference elements has a different offset amount with each of the adjacent plurality of peripheral elements.

According to the aspect, the optical elements adjacent to each other respectively emit the laser beam from the curved surface on the side which has the common curved shape of one of the convex curve and the concave curve. Therefore, intensity distribution of diffracted light generated by interference of emitted light provides a diffraction peak of multiple orders in accordance with an emission angle. However, the offset amounts generated by causing the surface vertexes of the curved surfaces to be offset from each other in the stepwise manner are different from each other in the respective elements between the optical elements adjacent to each other. Accordingly, the diffraction peak of the diffracted light is generated around the emission angle in accordance with the offset amount.

Therefore, according to the aspect, the offset amounts are different from each other between the respective reference elements which serve as a reference and the respective peripheral elements which are the optical elements adjacent to the periphery thereof. In this manner, the diffraction peaks of the diffracted light which is generated between the reference element and the respective adjacent peripheral elements can be offset from each other. Accordingly, a luminance irregularity felt by a viewer who views the diffracted light as a virtual image can be suppressed.

In another aspect of the present disclosure, the plurality of reference elements and the plurality of peripheral elements are alternately two-dimensionally arrayed along array directions, mutually adjacent ones of the plurality of reference elements and the plurality of peripheral elements along each of the array directions forming element pair sets, and a plurality of different types of the element pair sets are arranged in a fixed order along each of the array directions, the offset amount between the pair of the reference element and the peripheral element being different for each type of the element pair sets.

According to the aspect, the plurality of different types of the element pair sets are arranged in a fixed order along each of the array directions, and the offset amount between the pair of the reference element and the peripheral element is different for each type of the element pair sets. In this manner, the reference element of the respective element pair sets in each of the array directions can generate mutually different offset amounts between the reference element and the peripheral element forming the same element pair set and between the reference element and the peripheral element forming another adjacent element pair set. Therefore, with regard to the diffracted light generated between the reference element and the respective adjacent peripheral elements, an operation effect of shifting the diffraction peak in accordance with mutually different offset amounts can be achieved across an entire area of a two-dimensional array.

Moreover, in each of the array directions in which the arrangement order is fixed, the peripheral element of the respective element pair sets has the common offset amount between the peripheral element and the reference element forming the same element pair set and between the peripheral element and the reference element forming another adjacent element pair set. In this manner, the peripheral elements in which the diffraction peaks of the diffracted light generated between the adjacent reference elements on both sides are offset from each other can exist in any array direction.

As described above, according to an operation effect of shifting the diffraction peak viewed around the reference element and an operation effect of shifting the diffraction peak viewed around the peripheral element, an advantageous effect of suppressing occurrence of a luminance irregularity can be enhanced.

BRIEF DESCRIPTION OF THE DRAWINGS

FIG. 15 is a characteristic diagram illustrating a center of a diffraction peak according to an embodiment.

EMBODIMENTS FOR CARRYING OUT THE INVENTION

Hereinafter, an embodiment according to this disclosure will be described with reference to the drawings.

Figure 1:
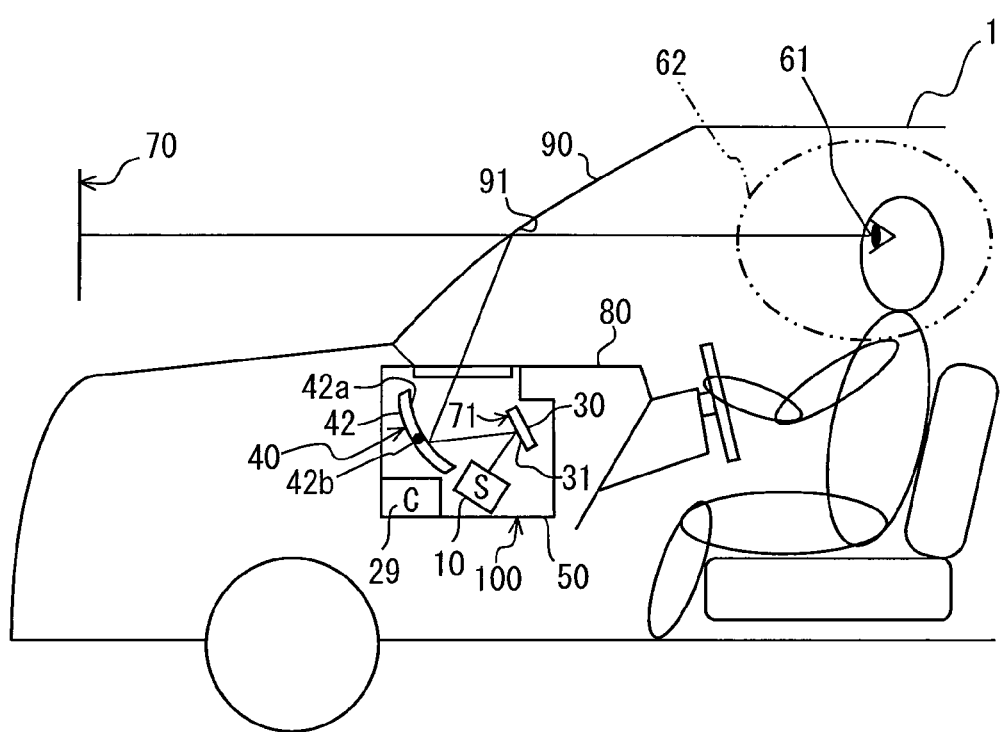
FIG. 1 is a schematic view illustrating a state where a HUD device according to an embodiment is mounted on a vehicle.

As illustrated in FIG. 1, a HUD device 100 according to an embodiment of this disclosure is mounted on a vehicle 1 serving as a "moving body", and is accommodated inside an instrument panel 80. The HUD device 100 projects a display image 71 on a windshield 90 serving as a "display member" of the vehicle 1. Here in the vehicle 1, an interior side surface of the windshield 90 provides a projection surface 91 on which the display image 71 is projected, in a curved concave surface shape or a flat plane shape. The windshield 90 in the vehicle 1 may have an angle difference for restricting an optical path difference, between the interior side surface and an exterior side surface. Alternatively, a vapor deposited membrane or film may be disposed on the interior side surface in order to restrict the optical path difference.

A light flux of the display image 71 reflected on the projection surface 91 reaches an eye point 61 of a viewer in the interior of the vehicle 1 where the display image 71 is projected on the projection surface 91. The viewer perceives the light flux which has reached the eye point 61, thereby viewing a virtual image 70 of the display image 71 which is formed in front of the windshield 90. At this time, the virtual image 70 is visible since the eye point 61 is located inside a visible region 60 of the viewer illustrated in FIG. 2.

Figure 3:
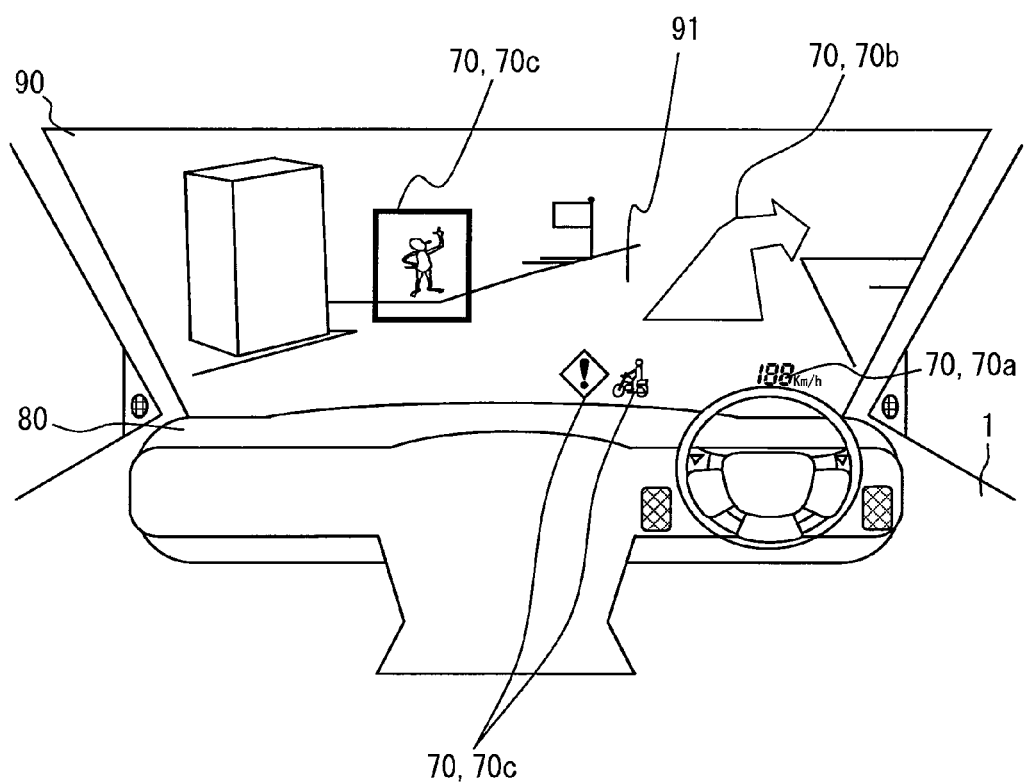
FIG. 3 is a front view illustrating a display state of a HUD device according to an embodiment.

As described above, the display image 71 is projected on the projection surface 91, thereby allowing the HUD device 100 to display the virtual image 70 of the display image 71 so as to be visible from the interior of the vehicle 1, as illustrated in FIG. 3. As the virtual image 70, an instruction display 70a in a traveling speed of the vehicle 1, an instruction display 70b in a traveling direction of the vehicle 1 using a navigation system, and a warning display 70c relating to the vehicle 1 are displayed thereon.

(Overall Features of HUD Device)

Hereinafter, overall characteristics of the HUD device 100 will be described. As illustrated in FIG. 1, the HUD device 100 includes a laser scanner 10, a controller 29, a screen member 30, and an optical system 40, inside a housing 50.

Figure 4:
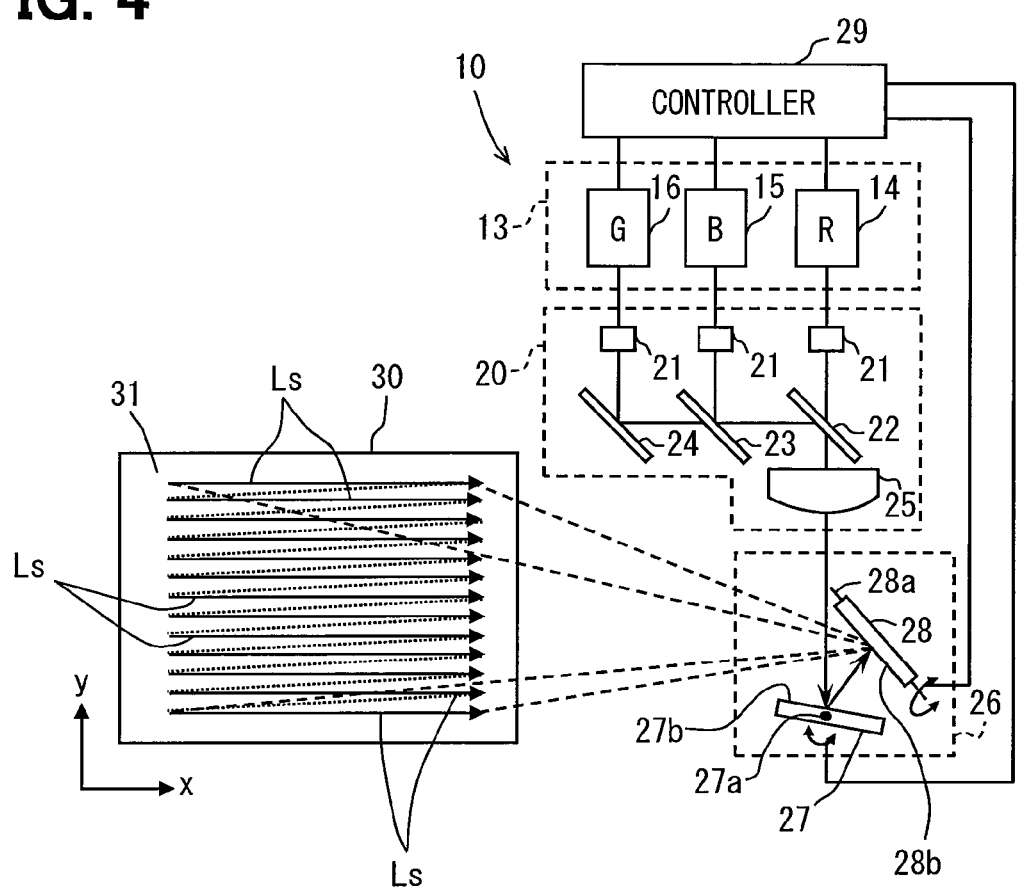
FIG. 4 is a schematic view illustrating a specific configuration of a HUD device according to an embodiment.

As illustrated in FIG. 4, the laser scanner 10 serving as a "projector" has a light source unit 13, a light guide unit 20, and micro electro mechanical systems (MEMS) 26.

The light source unit 13 is configured to include three laser projection units 14, 15, and 16. The respective laser projection units 14, 15, and 16 respectively project single wavelength laser beams having mutually different colors, in accordance with a control signal transmitted from the electrically connected controller 29. Specifically, for example, the laser projection unit 14 projects a red laser beam which appears in a range of a peak wavelength of 600 nm to 650 nm (preferably, 640 nm). For example, the laser projection unit 15 projects a blue laser beam which appears in a range of the peak wavelength of 430 nm to 470 nm (preferably, 450 nm). For example, the laser projection unit 16 projects a green laser beam which appears in a range of the peak wavelength of 490 nm to 530 nm (preferably, 515 nm). The laser beams of three colors which are projected from the respective laser projection units 14, 15, and 16 are subjected to additive color mixing in this way, thereby enabling various colors to be reproduced.

The light guide unit 20 is configured to include three collimating lenses 21, dichroic filters 22, 23, and 24, and a condenser lens 25. The respective collimating lenses 21 are arranged at intervals of 0.5 mm, for example, on a projection side of the laser beam, for the respectively corresponding laser projection units 14, 15, and 16. The respective collimating lenses 21 diffract the laser beam projected from the laser projection units 14, 15, and 16, thereby collimating the laser beam into parallel light.

The respective dichroic filters 22, 23, and 24 are arranged at intervals of 4 mm, for example, on the projection side of the laser projection units 14, 15, and 16, for the respectively corresponding collimating lenses 21. The respective dichroic filters 22, 23, and 24 cause the laser beam having a specific wavelength to be reflected thereon, and cause the laser beam having other wavelengths to be transmitted therethrough, within the laser beams which have passed through the corresponding collimating lenses 21. Specifically, the dichroic filter 22 arranged on the projection side of the laser projection unit 14 causes the red laser beam to be transmitted therethrough, and causes the other color laser beams to be reflected thereon. The dichroic filter 23 arranged on the projection side of the laser projection unit 15 causes the blue laser beam to be reflected thereon, and causes the other color laser beams to be transmitted therethrough. The dichroic filter 24 arranged on the projection side of the laser projection unit 16 causes the green laser beam to be reflected thereon, and causes the other color laser beams to be transmitted therethrough.

Here, the dichroic filter 23 is arranged at an interval of 6 mm, for example, on a side where the green laser beam is reflected on the dichroic filter 24. The dichroic filter 22 is arranged at an interval of 6 mm, for example, on a side where the blue laser beam is reflected on and the green laser beam is transmitted through the dichroic filter 23. Furthermore, the condenser lens 25 is arranged at an interval of 4 mm, for example, on a side where the red laser beam is transmitted through and the blue laser beam and the green laser beam are reflected on the dichroic filter 22. According to these arrangement forms, the red laser beam transmitted through the dichroic filter 22 and the blue laser beam and the green laser beam which are reflected on the dichroic filter 22 after being reflected on the respective dichroic filters 23 and 24 are incident on the condenser lens 25. In this manner, colors of these laser beams are mixed together.

The condenser lens 25 is a plano-convex lens having a flat incidence surface and a convex emitting surface. The condenser lens 25 focuses the laser beam by diffracting the laser beam incident on the incidence surface. As a result, the laser beam which has passed through the condenser lens 25 is emitted toward the MEMS 26.

The MEMS 26 is configured to include a first scanning mirror 27, a second scanning mirror 28, and drive units (not illustrated) of the scanning mirrors 27 and 28. A thin film-shaped reflection surface 27*b* is provided by means of metal deposition using aluminum, on a surface where a central portion of the first scanning mirror 27 faces the condenser lens 25 at an interval of 5 mm, for example. A thin film-shaped reflection surface 28*b* is provided by means of metal deposition using aluminum, on a surface where a central portion of the second scanning mirror 28 faces the first scanning mirror 27 at an interval of 1 mm, for example. The drive units of the MEMS 26 individually drive the respective scanning mirrors 27 and 28 so as to be respectively rotated around rotary shafts 27*a* and 28*a*, in accordance with a control signal transmitted from the electrically connected controller 29.

The central portion of the second scanning mirror 28 which configures a final stage of the laser scanner 10 is arranged at an interval of 100 mm, for example, from a scanning surface 31 of the screen member 30. According to the arrangement form, the laser beams sequentially incident on the scanning mirrors 27 and 28 from the condenser lens 25 are sequentially reflected on the reflection surfaces 27*b* and 28*b*, and are projected on the scanning surface 31.

Figure 2:
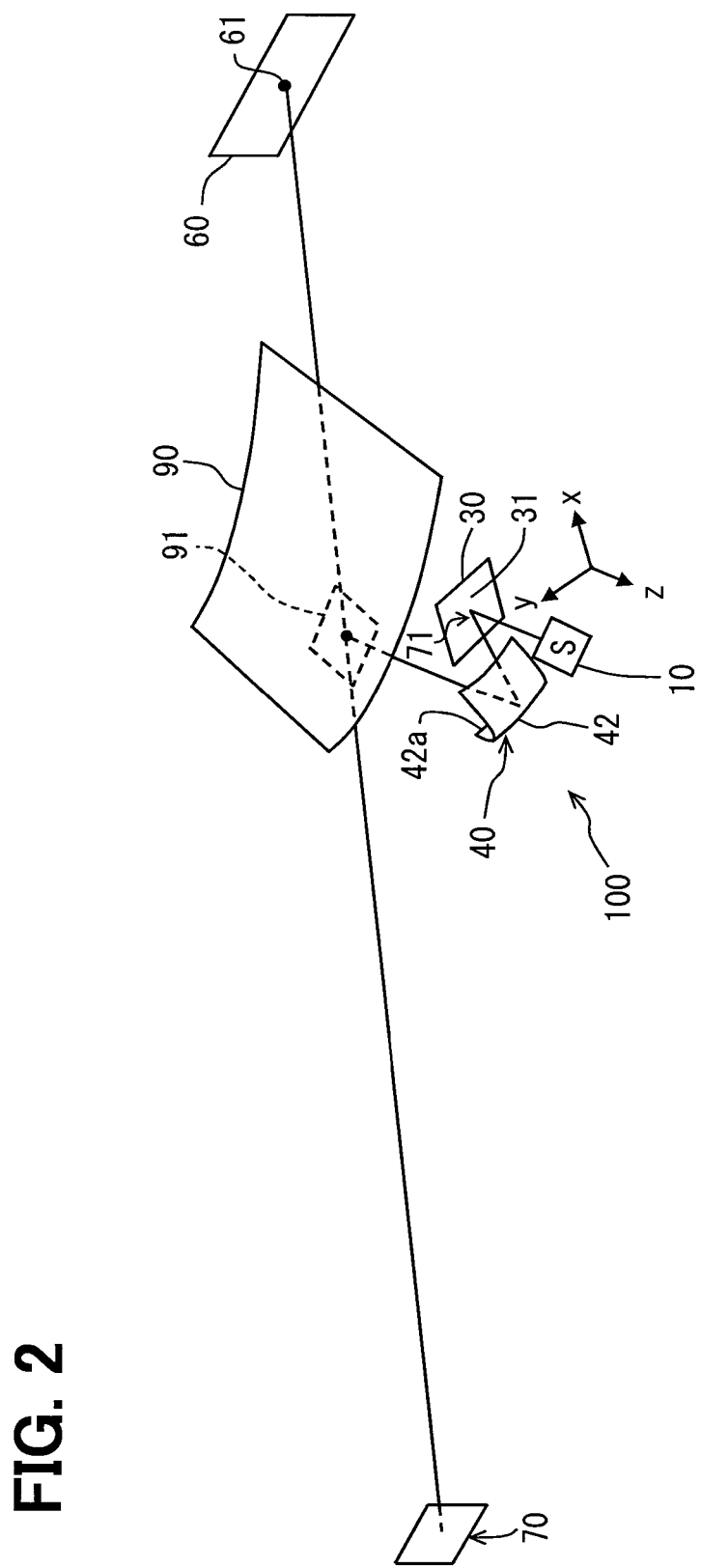
FIG. 2 is a perspective view illustrating a schematic configuration of a HUD device according to an embodiment.
Figure 5:
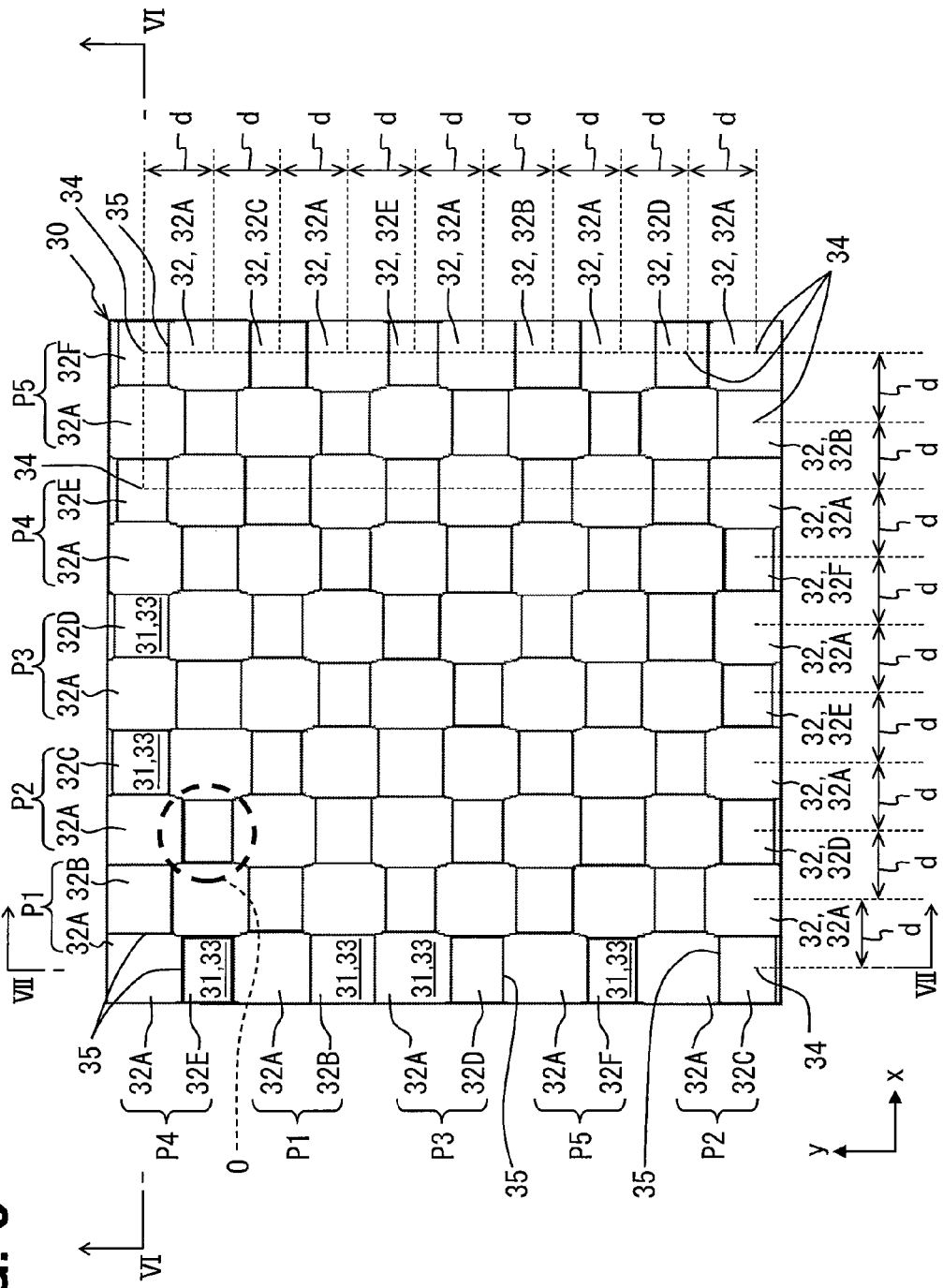
FIG. 5 is a top view partially illustrating a screen member according to an embodiment.

The controller 29 is a control circuit configured to include a processor. The controller 29 outputs a control signal to the respective laser projection units 14, 15, and 16, thereby intermittently projecting the pulsed laser beam. At the same time, the controller 29 outputs a control signal to the drive units of the scanning mirrors 27 and 28, thereby changing the projecting direction of the laser beam on the scanning surface 31 to a direction of an arrow in FIG. 4 along multiple scanning lines Ls. According to these controls, a region O where the laser beam is projected in a circular spot shape as illustrated in FIG. 5 is moved to the scanning surface 31, thereby drawing the display image 71. That is, the laser beam projected from the laser scanner 10 scans the scanning surface 31 in a horizontal direction x and in a vertical direction y, thereby providing the display image 71. Here, for example, the display image 71 is provided with 60 frames per second on the scanning surface 31, as an image having 480 pixels in the horizontal direction x and 240 pixels in the vertical direction y. As illustrated in FIG. 2, the horizontal direction x of the scanning surface 31 coincides with the horizontal direction of the vehicle 1. On the other hand, the vertical direction y of the scanning surface 31 may tilt from the vertical direction of the vehicle 1 as illustrated in FIG. 2, or may coincide with the vertical direction.

Figure 6:
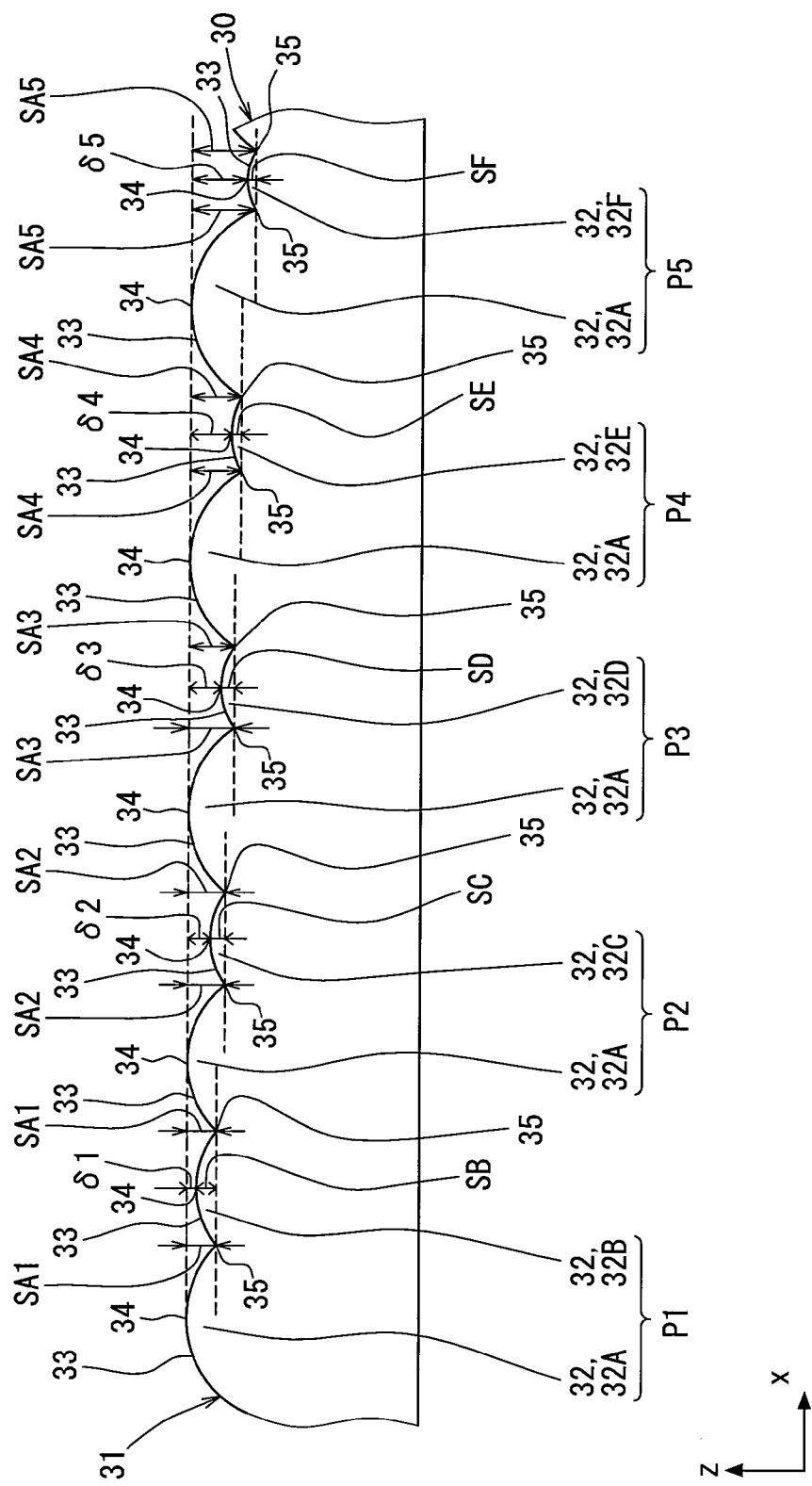
FIG. 6 is a view partially illustrating a screen member according to an embodiment, and is a cross-sectional view taken along line VI-VI in FIG. 5.
Figure 7:
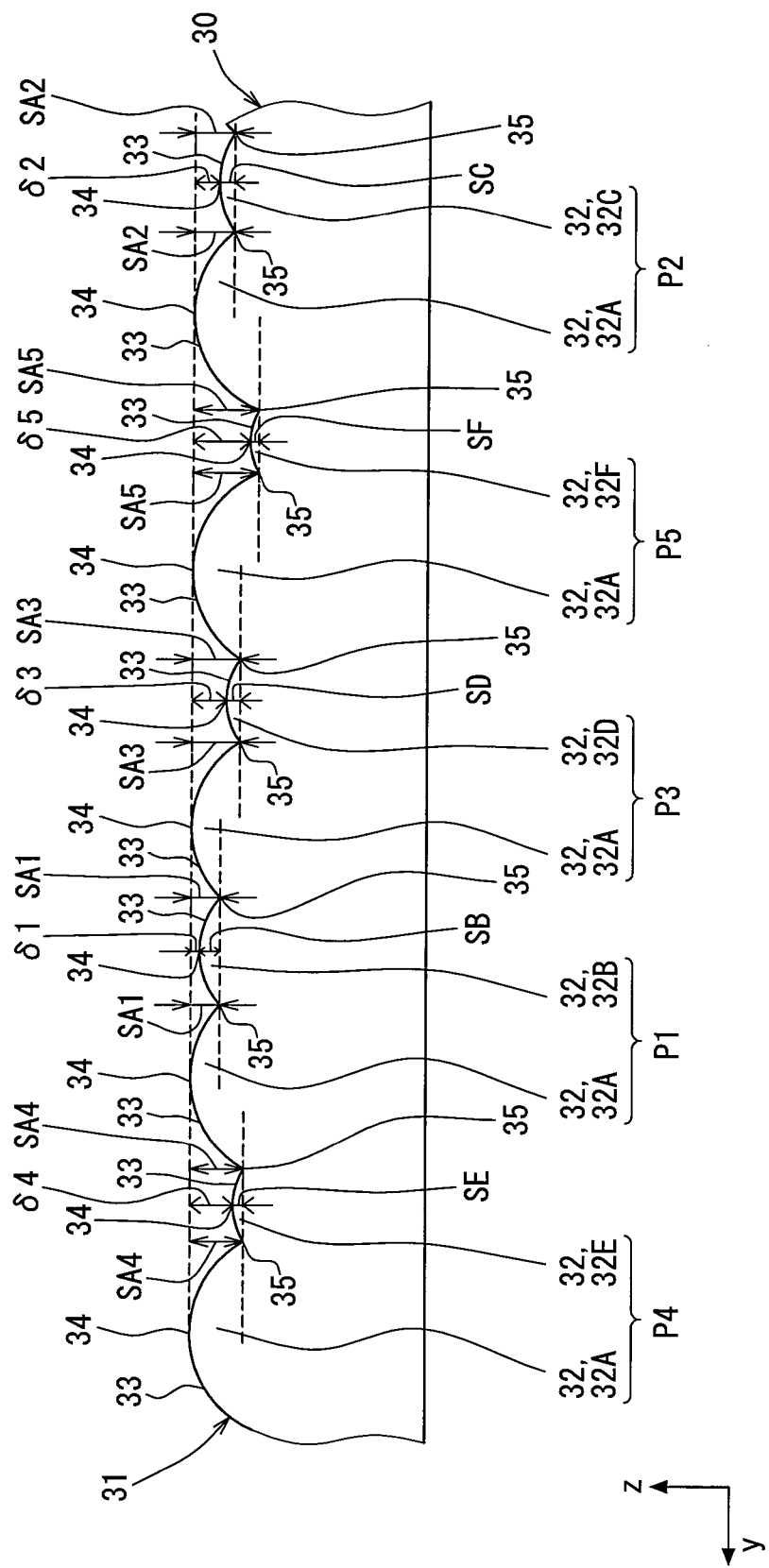
FIG. 7 is a view partially illustrating a screen member according to an embodiment, and is a cross-sectional view taken along line VII-VII in FIG. 5.

As illustrated in FIGS. 5 to 7, the reflection-type screen member 30 is provided by depositing aluminum on a surface of a resin substrate or a glass substrate. The screen member 30 is arranged above the laser scanner 10 in the vehicle 1 (refer to FIGS. 1 and 2). The screen member 30 is provided in such a way that a plurality of optical elements 32 serving as micro mirrors are two-dimensionally arrayed in a lattice pattern in the horizontal direction x and the vertical direction y. Hereinafter, the horizontal direction x and the vertical direction y are collectively referred to as array directions x and y.

In the screen member 30, a surface (specifically, a curved surface 33 to be described later) of the respective optical elements 32 configures the scanning surface 31. The surface of the respective optical elements 32 causes the laser beam projected on the scanning surface 31 to be reflected thereon, thereby diffusing and projecting the laser beam. Here, a diameter of the projection region O where the laser beam is projected on the scanning surface 31 is set to be equal to or greater than a half value of the minimum element width within element widths of the respective optical elements 32, for example. As illustrated in FIGS. 6 and 7, all of the respective optical elements 32 may be provided as an integrated body, or may be held in a common substrate by being provided as a separate body.

As illustrated in FIGS. 1 and 2, the optical system 40 has a concave mirror 42 and a drive unit thereof (not illustrated). The concave mirror 42 is provided by depositing aluminum on a surface of a resin substrate or a glass substrate. The concave mirror 42 causes the laser beam diffused by the scanning surface 31 to be reflected on a reflection surface 42*a*, thereby guiding the laser beam to the projection surface 91 side so as to project the display image 71. That is, the concave mirror 42 provides an optical path through which the diffused laser beam is guided from the scanning surface 31 so as to reach the projection surface 91. Here, the reflection surface 42*a* is formed in a smoothly curved shape, as a concave surface whose central portion is recessed in a direction away from the scanning surface 31 and the projection surface 91. In this manner, the reflection surface 42*a* can enlarge and project the display image 71.

The drive unit of the optical system 40 drives the concave mirror 42 so as to swing around a swinging shaft 42b illustrated in FIG. 1, in accordance with a control signal transmitted from the electrically connected controller 29. According to the swinging, the visible region 60 also ascends and descends in response to ascending and descending of an image forming position of the virtual image 70 of the projected display image 71. Here, the position of the visible region 60 is defined in view of eyelips 62. Specifically, the eyelips 62 represent a space region where the eye point 61 can exist when it is assumed that a viewer sits in a driver's seat in the interior of the vehicle 1. Therefore, it is assumed that at least a portion of the visible region 60 which ascends and descends in response to the swinging of the concave mirror 42 enters the inside of the eyelips 62 within a range of the swinging.

An optical element other than the concave mirror 42 may be disposed in the optical system 40 instead of or in addition to the concave mirror 42. Without disposing the optical system 40 (concave mirror 42), the laser beam diffused by the respective optical elements 32 may be directly projected on the projection surface 91.

(Detailed Characteristics of Optical Element)

Next, detailed characteristics of the optical element 32 will be described.

As illustrated in FIGS. 5 to 7, the surfaces of the respective optical elements 32 have convexly curved forms which are convexly curved as curved forms common to each other, thereby providing the curved surface 33 having an arcuate convex shape. The curved surface 33 of the respective optical elements 32 protrudes to face the laser scanner 10 and the optical system 40 along an orthogonal direction z (also refer to FIG. 2) orthogonal to the array directions x and y, and the most protruded point forms a surface vertex 34.

The optical elements 32 adjacent to each other in the respective array directions x and y provide a mutual boundary 35 therebetween by superimposing contours (outer edges) of the respective curved surfaces 33 on each other. At the same time, a peak pitch d represented by a distance between the surface vertexes 34 of the optical elements 32 adjacent to each other in the respective array directions x and y indicates a common value (that is, substantially the same value) in all of the optical elements 32. Furthermore, the radius of curvature of the curved surface 33 of the respective optical elements 32 in the respective array directions x and y indicates a common value (that is, substantially the same value) on a vertical cross-section passing through the surface vertex 34.

Here, with regard to the respective optical elements 32, an offset amount in a direction z from the surface vertex 34 to the boundary 35 (that is, an inflection point on a vertical cross-section in FIGS. 6 and 7) is referred to as a sag amount. The sag amounts are respectively illustrated in FIGS. 6 and 7 by the reference numerals SA1, SA2, SA3, SA4, SA5, SB, SC, SD, SE, and SF. With regard to the optical elements 32 and 32 immediately adjacent to each other, a difference between the sag amounts along the direction z, that is, a offset amount provided by the surface vertexes 34 and 34 being offset from each other in the direction z in a stepwise manner is referred to as an offset amount. The offset amounts are respectively illustrated in FIGS. 6 and 7 by the reference numerals 81, 82, 83, 84, and 85. In order to facilitate understanding in FIGS. 6 and 7, the respective sag amounts SA1, SA2, SA3, SA4, SA5, SB, SC, SD, SE, and SF and the respective offset amounts 81, 82, 83, 84, and 85 are greatly exaggerated in the illustration.

The present inventors have intensively studied such a screen member 30 having the curved surface 33 of the respective optical elements 32 to diffuse and emit the laser beam. As a result, the present inventors have obtained the following knowledge. Diffracted light having intensity distribution which provides a diffraction peak of multiple orders in accordance with an emission angle is generated due to interference between the laser beams respectively emitted from the curved surfaces 33 of the optical elements 32 adjacent to each other. A luminance irregularity would be generated by the multiplex diffraction described above.

Figure 8:
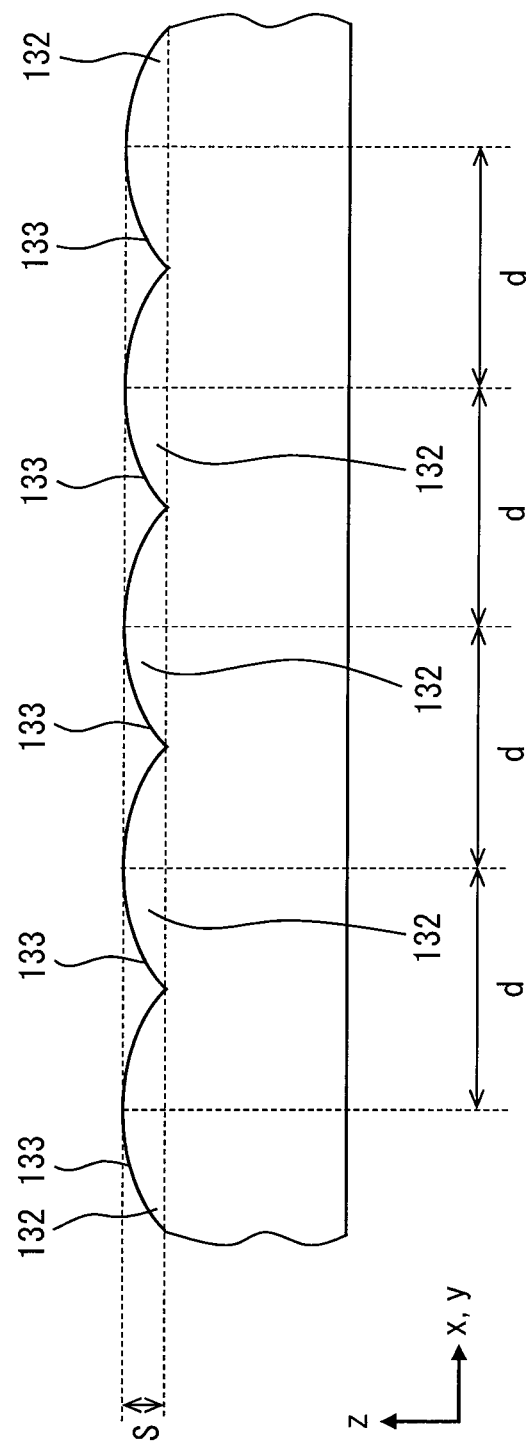
FIG. 8 is a schematic view partially illustrating a screen member according to a comparative example.
Figure 9:
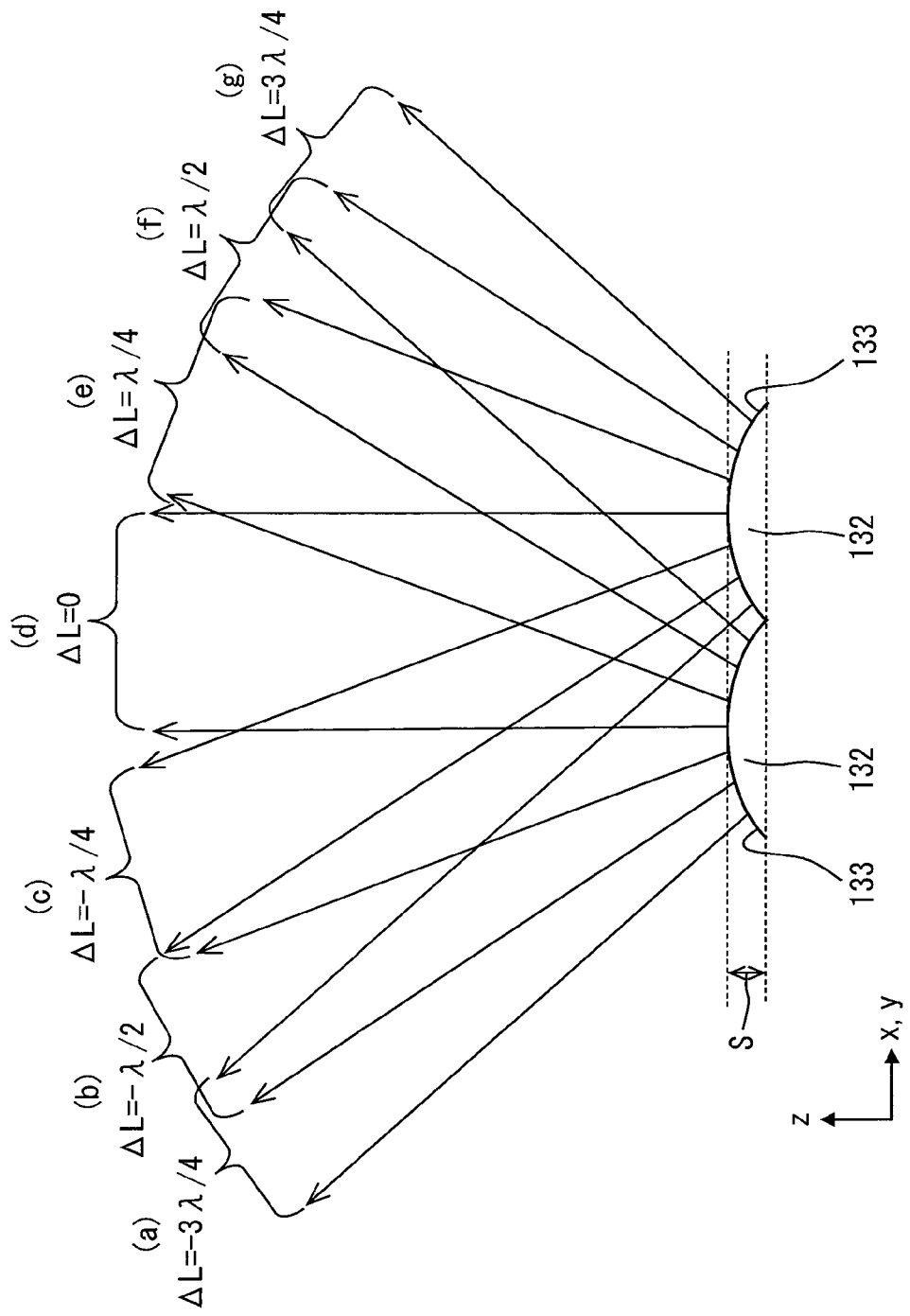
FIG. 9 is a schematic view for describing an optical path difference of emitted light according to a comparative example.

Here, as illustrated in FIGS. 8 and 9, a HUD device according to a comparative example will be first described. In this comparative example, all of respective optical elements 132 have the same dimension and design. That is, in the comparative example, all offset amounts of the optical elements 132 adjacent to each other are set to substantially 0 by providing a sag amount S common to the respective optical elements 132. According to this comparative example, an optical path length difference ΔL is generated in laser beams, since the laser beams interfere with each other by being respectively emitted at an emission angle θ (refer to FIG. 10) from curved surfaces 133 of the optical elements 132 adjacent to each other. Here, the optical path length difference ΔL is represented by Expression 1 below using an approximate origin of sin θ≈θ[rad], and a peak pitch d common to all of the optical elements 132. When a wavelength of the laser beam is defined as λ, an angle difference α (refer to FIG. 10) of the emission angle θ at which the optical path length difference ΔL is changed by an amount of the wavelength λ, that is, the angle difference α of the emission angle θ at which a diffraction peak order is changed by one is represented by Expression 2 below using an approximate origin of sin α≈α, and the peak pitch d.

$$\Delta L = d*\theta \quad \text{(Expression 1)}$$

$$\alpha = \lambda/d \quad \text{(Expression 2)}$$

Figure 10:
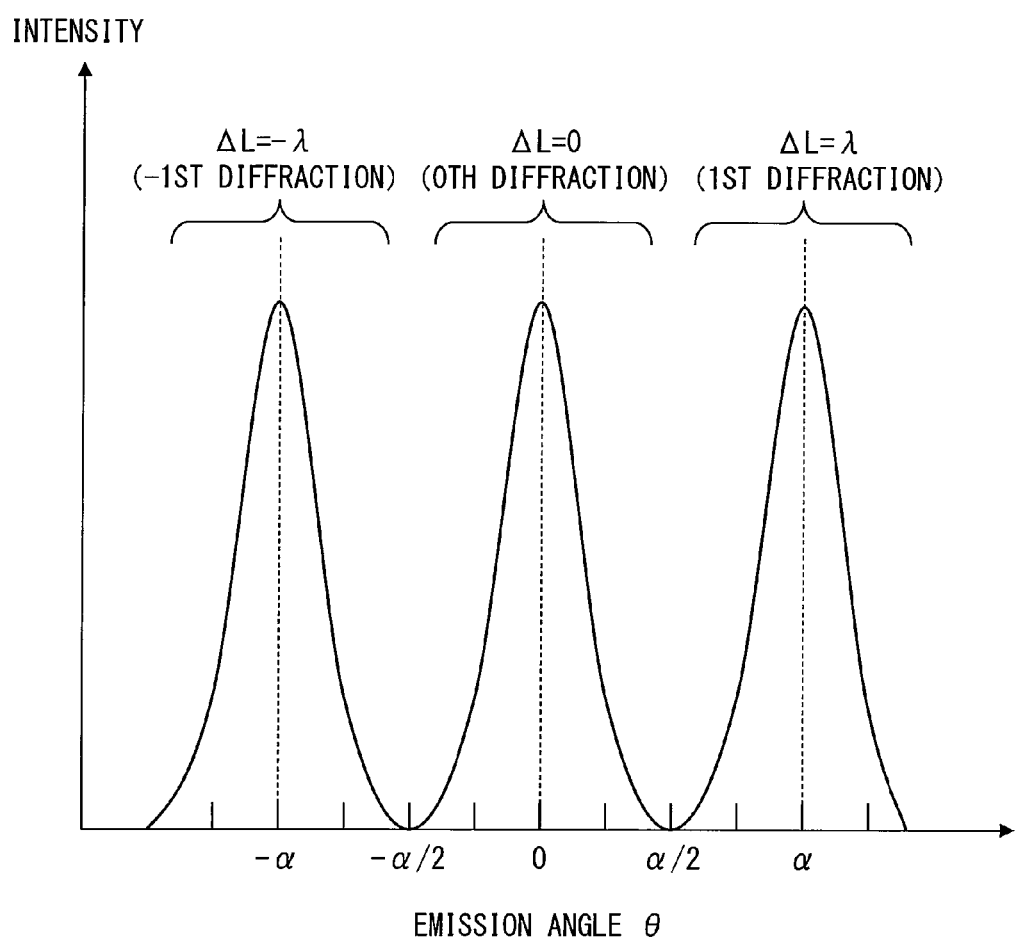
FIG. 10 is a characteristic diagram illustrating intensity distribution of diffracted light according to a comparative example.

FIG. 10 illustrates intensity distribution in respective array directions x and y when the optical path length difference ΔL becomes 0 and ±λ in the comparative example based on Expressions 1 and 2, that is, when the diffraction peak order becomes 0 and ±1. As illustrated in FIG. 10, the intensity distribution is made in accordance with the angle difference α of the emission angle θ. That is, diffraction peaks of diffracted light which are generated between one optical element 132 and the adjacent elements 132 on both sides are generated around every emission angle θ changed from 0 to ±α. Accordingly, the diffraction peaks are superimposed on each other so as to increase the intensity. Diffraction valleys of the diffracted light which are generated between one optical element 132 and the adjacent elements 132 on both sides are generated around every emission angle θ changed from α/2 to α and around every emission angle θ changed from −α/2 to −α. Accordingly, even if the diffraction valleys are superimposed on each other, the intensity is less likely to increase. The diffraction valley means a portion which is a valley between the diffraction peaks in the intensity distribution of the diffracted light.

Figure 11:
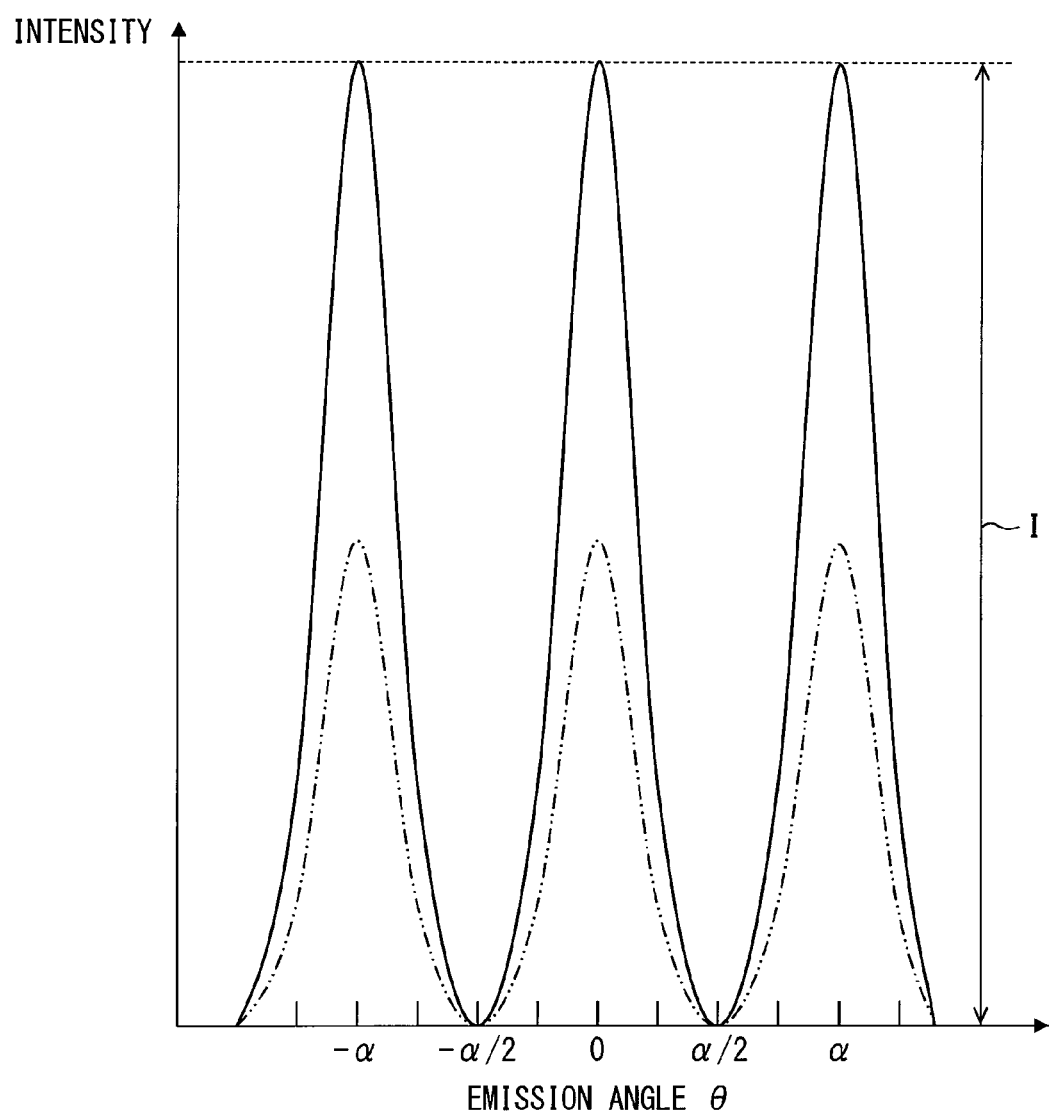
FIG. 11 is a characteristic diagram illustrating superimposition of diffracted light according to a comparative example.

As described above, if the diffracted light generated between one optical element 132 and the adjacent elements 132 on both sides is superimposed in each of the array directions x and y, the intensity distribution illustrated in FIG. 11 is obtained. Here, in the intensity distribution in FIG. 11 which relates to any one of the array directions x and y, the diffracted light respectively generated between one optical element 132 and the adjacent elements 132 on both sides is illustrated by a two-dot chain line graph, and a superimposition result of the diffracted light is illustrated by a solid line graph. As is understood from the intensity distribution, an intensity difference I increases in a case of the emission angle θ at which centers of the diffraction peaks are superimposed (that is, every ±α from θ) and the emission angle θ at which centers of the diffraction valleys are superimposed (that is, every α from α/2 and every −α from −α/2). Therefore, a viewer who views the diffracted light as the virtual image 70 is forced to feel a luminance irregularity in accordance with the increased intensity difference I.

Figure 12:
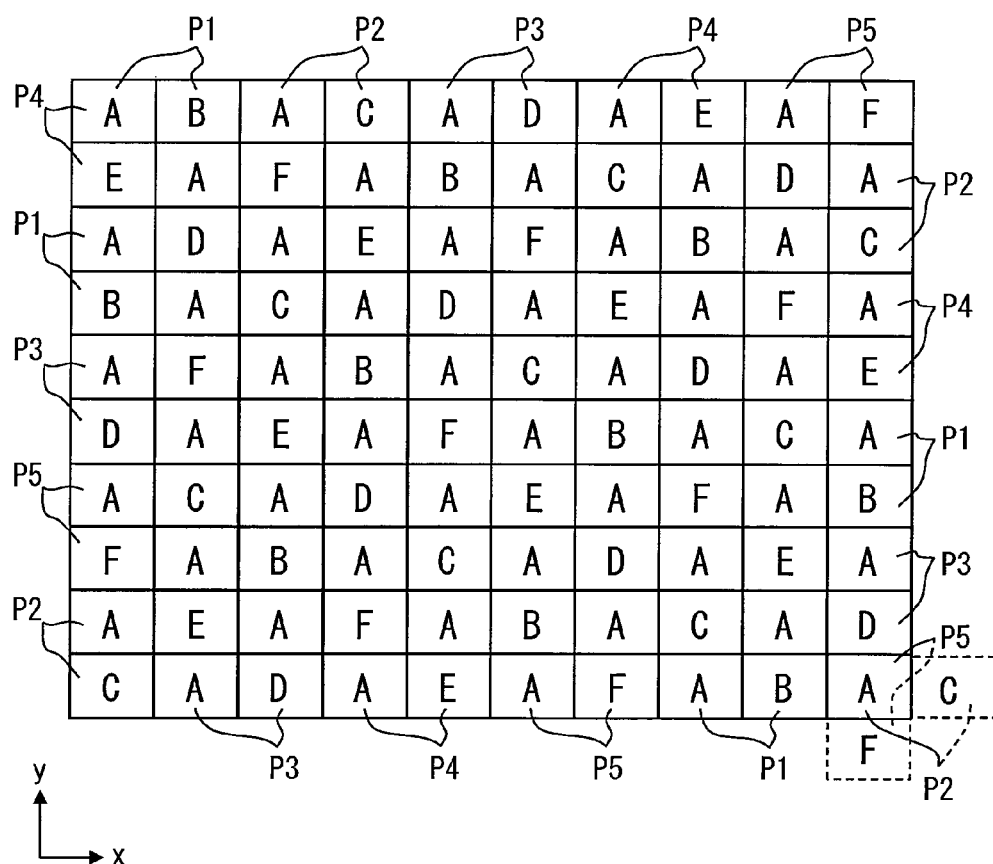
FIG. 12 is a schematic view illustrating an array form of an optical element in a screen member according to an embodiment.

Next, different points between this embodiment and the comparative example will be described in detail. As illustrated in FIGS. 5 to 7 and 12, the respective optical elements 32 according to the present embodiment are classified into any one of a plurality of reference elements 32A serving as a reference and a plurality of peripheral elements 32B, 32C, 32D, 32E, and 32F which are adjacent to the respective reference elements 32A at every multiple locations. The reference elements 32A and the different types of the peripheral elements 32B, 32C, 32D, 32E, and 32F surrounding the reference elements 32A have different dimensions and designs. In order to facilitate understanding of the description, FIG. 12 schematically illustrates an array form of the reference elements 32A and the peripheral elements 32B, 32C, 32D, 32E, and 32F, and only the last alphabet letters of the reference numerals are illustrated in contours of the respective elements.

Specifically, a pair of the reference element 32A and the peripheral element 32B which are immediately adjacent to each other in the respective array directions x and y forms a first element pair set P1. In order to represent the offset amount δ1 between the elements 32A and 32B which are paired, jp is defined as an integer of 0 or more, jm is defined as an integer of 1 or more, a wavelength of the laser beam is defined as λ, and ϵ1 is defined as a numerical value that meets a condition that the numerical value is greater than −λ/32 and smaller than λ/32. Based on these definitions, the offset amount δ1 is represented by Expression 3 or Expression 4 below. Here, the sag amount SA1 corresponding to the offset amount δ1 is provided for the reference element 32A between the surface vertex 34 of the reference element 32A and the peripheral element 32B of the same pair set P1. At the same time, the sag amount SB corresponding to the offset amount δ1 is provided for the peripheral element 32B between the peripheral element 32B and the reference element 32A of the same pair set P1.

$$\delta 1=\{(8jp+1)/16\}*\lambda+\epsilon 1 \quad \text{(Expression 3)}$$

$$\delta 1=\{(8jm-1)/16\}*\lambda+\epsilon 1 \quad \text{(Expression 4)}$$

A pair of the reference element 32A and the peripheral element 32C which are adjacent to each other in the respective array directions x and y forms a second element pair set P2. In order to represent the offset amount δ2 between the elements 32A and 32C which are paired, k is defined as an odd number of 1 or more, a wavelength of the laser beam is defined as λ, and ϵ2 is defined as a numerical value that meets a condition which is greater than −λ/32 and which is smaller than λ/32. Based on these definitions, the offset amount δ2 is represented by Expression 5 below. Here, the sag amount SA2 corresponding to the offset amount δ2 is provided for the reference element 32A between the surface vertex 34 of the reference element 32A itself and the peripheral element 32C of the same pair set P2. At the same time, the sag amount SC corresponding to the offset amount 82 is provided for the reference element 32C between the reference element 32C and the reference element 32A of the same pair set P2.

$$\delta 2=(k/8)*\lambda+\epsilon 2 \quad \text{(Expression 5)}$$

A pair of the reference element 32A and the peripheral element 32D which are adjacent to each other in the respective array directions x and y configures a third element pair set P3. In order to represent the offset amount 83 between the elements 32A and 32D which are paired, Ip is defined as an integer of 0 or more, Im is defined as an integer of 1 or more, a wavelength of the laser beam is defined as λ, and ϵ3 is defined as a numerical value that meets a condition which is greater than −λ/32 and which is smaller than λ/32. Based on these definitions, the offset amount δ3 is represented by Expression 6 or Expression 7 below. Here, the sag amount SA3 corresponding to the offset amount δ3 is provided for the reference element 32A between the surface vertex 34 of the reference element 32A itself and the peripheral element 32D of the same pair set P3. At the same time, the sag amount SD corresponding to the offset amount δ3 is provided for the reference element 32D between the reference element 32D and the reference element 32A of the same pair set P3.

$$\delta 3=\{(8Ip+3)/16\}*\lambda+\epsilon 3 \quad \text{(Expression 6)}$$

$$\delta 3=\{(8Im-3)/16\}*\lambda+\epsilon 3 \quad \text{(Expression 7)}$$

A pair of the reference element 32A and the peripheral element 32E which are adjacent to each other in the respective array directions x and y configures a fourth element pair set P4. In order to represent the offset amount 84 between the elements 32A and 32E which are paired, m is defined as an odd number of 1 or more, a wavelength of the laser beam is defined as λ, and ϵ4 is defined as a numerical value that meets a condition that the numerical value is greater than −λ/32 and smaller than λ/32. Based on these definitions, the offset amount 84 is represented by Expression 8 below. Here, the sag amount SA4 corresponding to the offset amount δ4 is provided for the reference element 32A between the surface vertex 34 of the reference element 32A and the peripheral element 32E of the same pair set P4. At the same time, the sag amount SE corresponding to the offset amount δ4 is provided for the peripheral element 32E between the peripheral element 32E and the reference element 32A of the same pair set P4.

$$\delta 4=(m/4)*\lambda+\epsilon 4 \quad \text{(Expression 8)}$$

A pair of the reference element 32A and the peripheral element 32F which are adjacent to each other in the respective array directions x and y forms a fifth element pair set P5. In order to represent the offset amount 85 between the elements 32A and 32F which are paired, n is defined as an integer of 0 or more, a wavelength of the laser beam is defined as λ, and ϵ5 is defined as a numerical value that meets a condition that the reference numeral is greater than −λ/32 and smaller than λ/32. Based on these definitions, the step amount 85 is represented by Expression 9 below. Here, the sag amount SA5 corresponding to the step amount δ5 is provided for the reference element 32A between the surface vertex 34 of the reference element 32A and the peripheral element 32F of the same pair set P5. At the same time, the sag amount SF corresponding to the step amount δ5 is provided for the peripheral element 32F between the peripheral element 32F and the reference element 32A of the same pair set P5.

$$\delta 5=(n/2)*\lambda+\epsilon 5 \quad \text{(Expression 9)}$$

Figure 13:
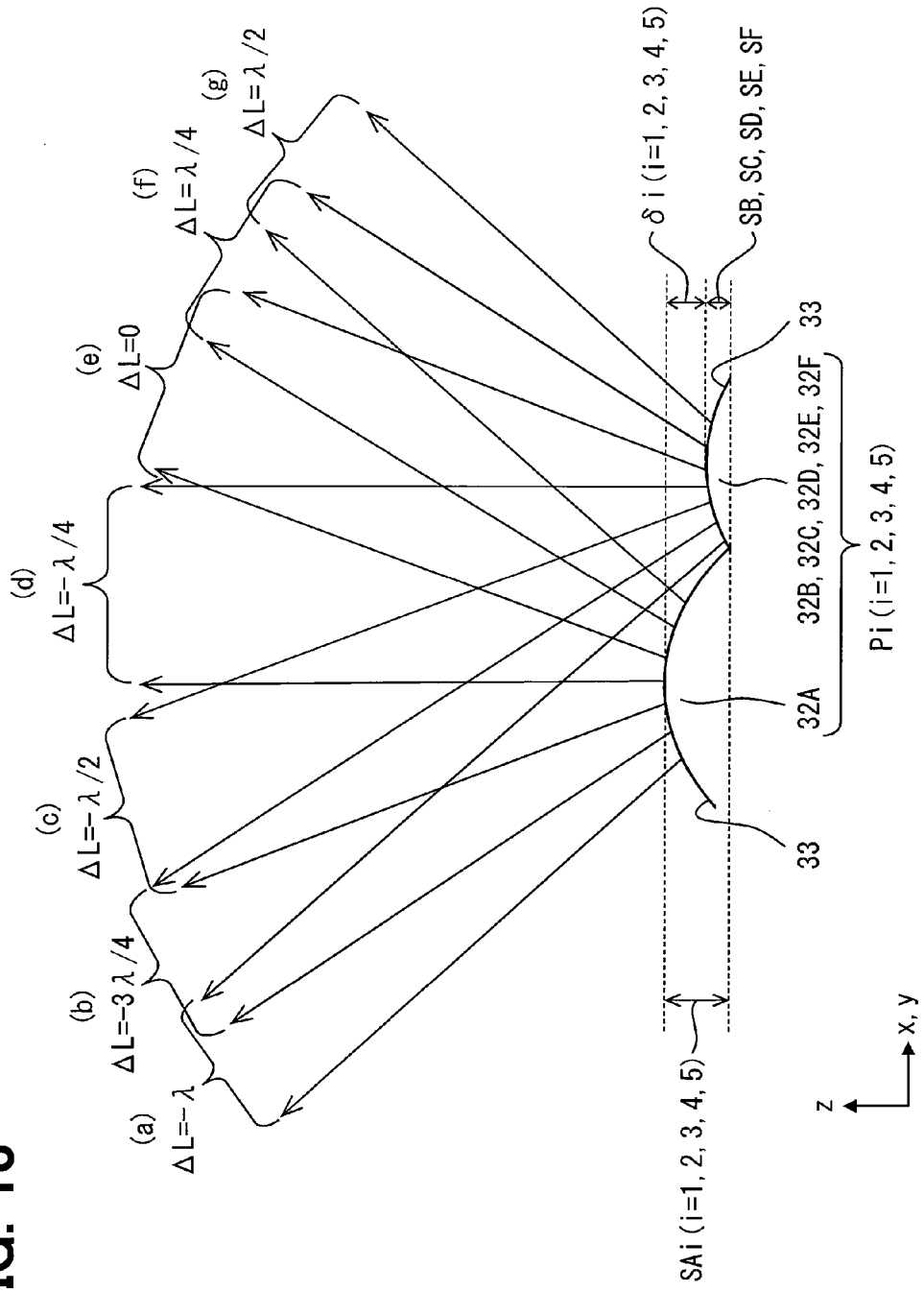
FIG. 13 is a schematic view for describing an optical path difference of emitted light according to an embodiment.

Here, in a case of i=1, 2, 3, 4, and 5, a correlation among the element pair set Pi, the step amount δi, and the sag amounts SAi, SB, SC, SD, SE, and SF indicates a relationship as schematically illustrated in FIG. 13. Based on the correlation, in this embodiment, the plurality of different types of element pair sets Pi classified with the different offset amounts δ1 from each other in accordance with Expressions 3 to 9 are arranged in the fixed order in each of the array directions x and y. That is, an arrangement order of the element pair sets Pi in the horizontal direction x is fixed in the order of P1, P2, P3, P4, and P5 from the left side to the right side in FIGS. 5 and 12. On the other hand, an arrangement order of the element pair sets Pi in the vertical direction y is fixed in the order of P4, P1, P3, P5, and P2 from the upper side to the lower side in FIGS. 5 and 12.

According to this fixed arrangement order, an array form in which the reference element 32A and any one of the peripheral elements 32B, 32C, 32D, 32E, and 32F are alternately arrayed appears in the respective array directions x and y. At the same time, according to the fixed arrangement order, the respective peripheral elements 32B, 32C, 32D, 32E, and 32F are interposed between the reference elements 32A from both sides in any one of the array directions x and y. It should be noted that, according to the fixed arrangement order, the array number of the reference elements 32A and the respective peripheral elements 32B, 32C, 32D, 32E, and 32F shows that one of the respective peripheral elements 32B, 32C, 32D, 32E, and 32F is arrayed for five of the reference elements 32A.

In this embodiment, the reference elements 32A of the respective element pair sets Pi also respectively have the offset amounts δ1, δ2, δ3, δ4, and δ5 between the reference elements 32A and the peripheral elements 32B, 32C, 32D, 32E, and 32F of the other element pair sets Pi which are adjacent thereto in the arrangement order as illustrated in FIGS. 6 and 7. In this manner, the reference elements 32A of the respective element pair sets Pi also have the different offset amounts δi between the reference elements 32A and the peripheral elements 32B, 32C, 32D, 32E, and 32F which are adjacent thereto in any one of the directions x and y. On the other hand, the peripheral elements 32B, 32C, 32D, 32E, and 32F of the respective element pair sets Pi also have the common offset amounts δ1 between the peripheral elements 32B, 32C, 32D, 32E, and 32F and the reference elements 32A of the same element pair sets Pi, and between the peripheral elements 32B, 32C, 32D, 32E, and 32F and the reference elements 32A of the other element pair sets Pi which are adjacent thereto in the arrangement order. According to these offset amounts δi, the thickness of the screen member 30 at the surface vertex 34 of the curved surface 33 of the reference element 32A is different from the thickness of the screen member 30 at the surface vertex 34 of all of the curved surfaces 33 of the adjacent optical elements 32. It is preferable to secure an element width of the respective peripheral elements 32B, 32C, 32D, 32E, and 32F by setting all offset amounts δi to 1.2 μm or less.

Furthermore, in the reference elements 32A of the respective element pair sets Pi, the sag amounts SAi from the peripheral elements 32B, 32C, 32D, 32E, and 32F forming the same element pair sets Pi to the surface vertex 34 of the reference elements 32A are different from each other in accordance with the respectively corresponding offset amounts δi. Similarly, in the reference elements 32A of the respective element pair sets Pi, the sag amounts SAi from the peripheral elements 32B, 32C, 32D, 32E, and 32F forming the other element pair sets Pi which are adjacent thereto in the arrangement order to the surface vertex 34 of the reference element 32A are different from each other in accordance with the respectively corresponding offset amounts δi. In this embodiment, in order to provide these sag amounts SAi, any boundary 35 interposed between the reference elements 32A and the respective peripheral elements 32B, 32C, 32D, 32E, and 32F is formed in a linear shape as illustrated in FIGS. 6 and 7.

Furthermore, in the peripheral elements 32B, 32C, 32D, 32E, and 32F of the respective element pair sets Pi, the sag amounts SB, SC, SD, SE, and SF from the reference element 32A forming the same element pair set Pi to the surface vertexes 34 of the peripheral elements 32B, 32C, 32D, and 32F are different from each other in accordance with the respectively corresponding offset amounts Si. Similarly, in the peripheral elements 32B, 32C, 32D, 32E, and 32F of the respective element pair sets Pi, the sag amounts SB, SC, SD, SE, and SF from the reference element 32A of the element pair set Pi which is adjacent thereto in the arrangement order to the surface vertexes 34 of the peripheral elements 32B, 32C, 32D, and 32F are also different from each other in accordance with the respectively corresponding offset amounts δi. In this embodiment, in order to generate these sag amounts SB, SC, SD, SE, and SF, the peak pitches d between the respective peripheral elements 32B, 32C, 32D, 32E, and 32F and the reference elements 32A are set in common as described above.

In this embodiment, the optical path length difference ΔL is generated in laser beams, since the laser beams interfere with each other by being respectively emitted at the emission angle θ (refer to FIG. 14) from the curved surfaces 33 of the optical elements 32 adjacent to each other. Here, the optical path length difference ΔL is represented by Expression 10 or Expression 11 below using an approximate origin of sin θ≈θ[rad], and the peak pitch d which is sufficiently greater than any one of the offset amounts δi. Specifically, Expression 10 is established between the respective peripheral elements 32B, 32C, 32D, 32E, and 32F and the adjacent reference element 32A on one side thereof (for example, the right side in FIGS. 6 and 7) in each of the array directions x and y. On the other hand, Expression 11 is established between the respective peripheral elements 32B, 32C, 32D, 32E, and 32F and the adjacent reference element 32A on the opposite side thereof (for example, the left side in FIGS. 6 and 7) in each of the array directions x and y. Furthermore, the angle difference α (refer to FIG. 14) of the emission angle θ at which the optical path length difference ΔL is changed by an amount of the wavelength λ, that is, the angle difference α of the emission angle θ at which a diffraction peak order is changed by one is represented by Expression 12 below using the peak pitch d, similarly to the comparative example.

$$\Delta L = d^*\theta - 2^*\delta i \quad \text{(Expression 10)}$$

$$\Delta L = d^*\theta + 2^*\delta i \quad \text{(Expression 11)}$$

$$\alpha = \lambda/d \quad \text{(Expression 12)}$$

According to this embodiment in which the laser scanner 10 projects laser beams of multiple colors, the wavelength λ used in Expressions 3 to 9 and 12 is set for a laser beam of at least one color. For example, when the wavelength λ is set for the laser beam of one color, it is preferable to set a peak wavelength of a green laser beam which allows high visibility or a peak wavelength of a red laser beam which allows a large diffraction angle to be the wavelength λ. When the wavelength λ is set for laser beams of two or more colors, it is preferable to establish Expressions 3 to 9 for every peak wavelength λ of the laser beams of two or more colors.

Figure 14:
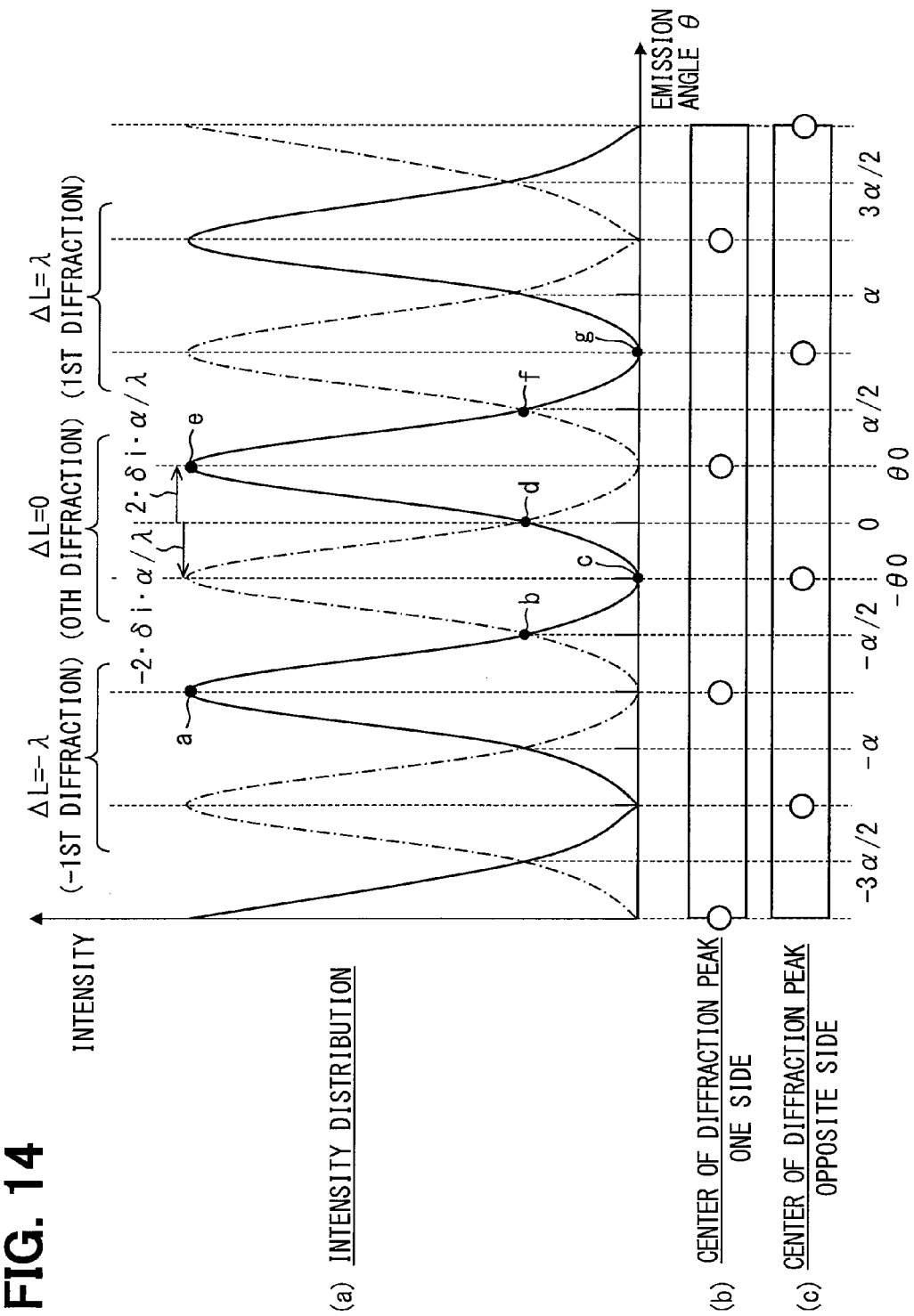
FIG. 14 is a characteristic diagram illustrating intensity distribution (a) and centers (b) and (c) of diffraction peaks of diffracted light according to an embodiment.

When the optical path length difference ΔL according to this embodiment becomes 0 and ±λ based on Expressions 10, 11, and 12 described above, that is, when the diffraction peak order is 0 and ±1, the intensity distribution in the respective array directions x and y is made in accordance with the angle difference α of the emission angle θ as illustrated in FIG. 14. That is, the diffraction peaks generated between the respective peripheral elements 32B, 32C, 32D, 32E, and 32F and the adjacent reference element 32A on one side in accordance with Expressions 10 and 12 are generated around every emission angle θ changed from the $0^{th}$ diffraction angle θ0 offset from 0 by an amount of 2*δi*α/λ to ±α. The diffraction peaks generated between the respective peripheral elements 32B, 32C, 32D, 32E, and 32F and the adjacent reference element 32A on the opposite side in accordance with Expressions 11 and 12 are generated around every emission angle θ changed from the $0^{th}$ diffraction angle −θ0 offset from 0 by an amount of −2*δi*α/λ to ±α. FIG. 14 illustrates an example in which δ2=λ/8 is set to generate the diffraction peak at every ±α from each of θ0=α/4 and −θ0=−α/4. FIG. 14(a) illustrates the intensity distribution, and FIGS. 14(b) and 14(c) illustrate the center of the diffraction peak. Points a to g which are marked on the solid line graph in FIG. 14(a) respectively correspond to directions a to g of the diffracted light which generates each optical path length difference ΔL illustrated in FIG. 13.

According to this principle, the diffraction peaks generated between the peripheral elements 32B, 32C, and 32D and the adjacent reference elements 32A on both sides in each of the array directions x and y are offset as illustrated in FIGS. 15(a) to 15(c), in accordance with the offset amounts δi which are common to both sides. The diffraction peaks generated between the peripheral elements 32E and 32F and the adjacent reference elements 32A on both sides in each of the array directions x and y, when ϵ4 and ϵ5 of Expressions 8 and 9 are not 0, are offset as illustrated in FIGS. 15(d) and 15(e), in accordance with the offset amounts δi which are common to both sides. As a result, for example, as illustrated in FIGS. 14 and 15(b), the diffraction peak generated between the peripheral element 32C and the adjacent reference element 32A on one side thereof is superimposed on the diffraction valley generated between the peripheral element 32C and the adjacent reference element 32A on the opposite side.

Figure 16:
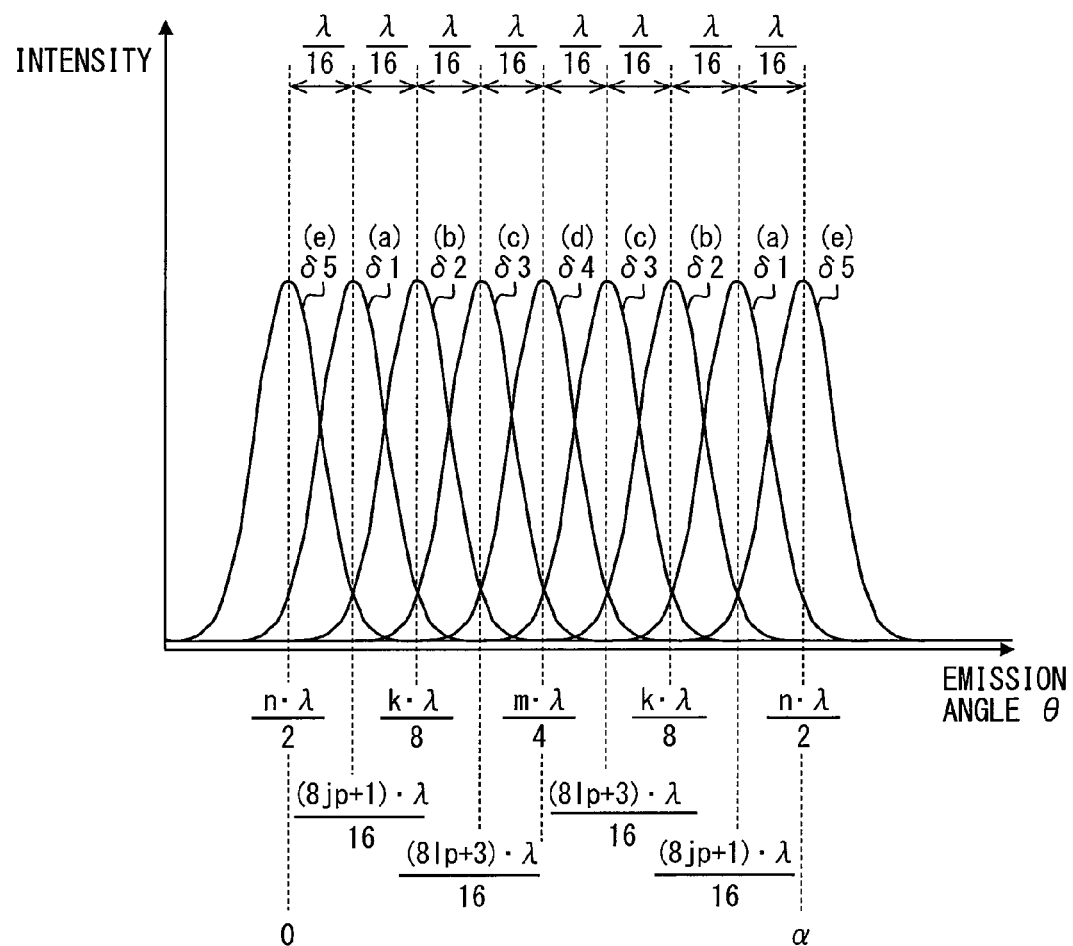
FIG. 16 is a characteristic diagram illustrating intensity distribution of diffracted light according to an embodiment.

Hitherto, description is made on the diffraction peak of the diffracted light which is generated around the peripheral elements 32B, 32C, 32D, 32E, and 32F with the reference element 32A. Next, description will be made on the diffraction peak of the diffracted light which is generated around the reference element 32A with the peripheral elements 32B, 32C, 32D, 32E, and 32F. As illustrated in FIGS. 15 and 16, the diffraction peaks generated between the reference element 32A and the adjacent peripheral elements 32B, 32C, 32D, 32E, and 32F are offset from each other in the intensity distribution by each amount of λ/16±ϵ in accordance with the mutually different offset amounts δi. Here, ±ϵ serves as a deviation from λ/16, and is determined in accordance with ϵ1, ϵ2, ϵ3, ϵ4, and ϵ5 of Expressions 3 to 9 in which the reference element 32A corresponds to each of the adjacent peripheral elements 32B, 32C, 32D, 32E, and 32F. In order to facilitate understanding of the description, FIGS. 16 and 17 (to be described later) illustrate a case where all ϵ1, ϵ2, ϵ3, ϵ4, and ϵ5 are 0, in other words, a case where all ±ϵ is 0.

Figure 17:
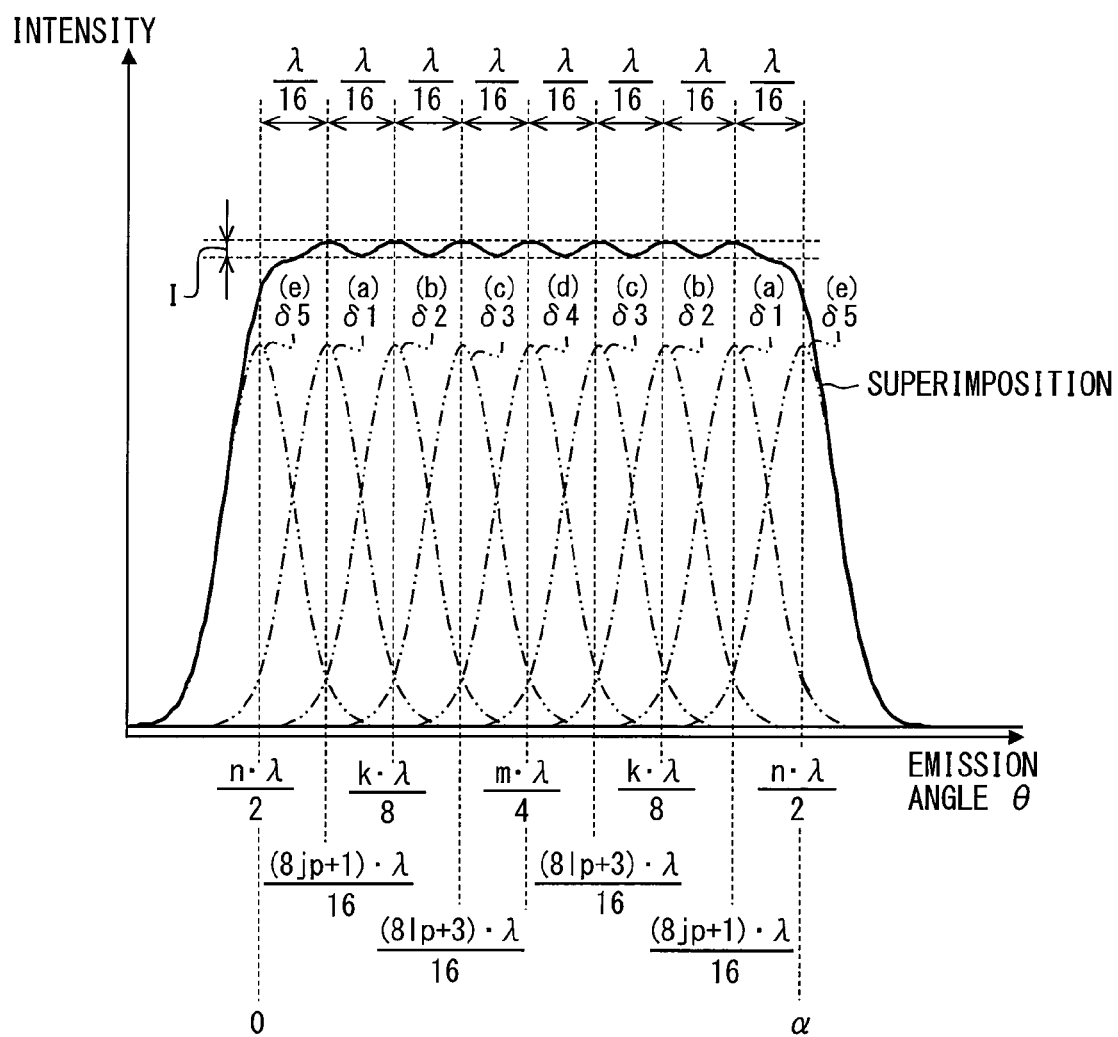
FIG. 17 is a characteristic diagram illustrating superimposition of diffracted light according to an embodiment.

As a result, for example, as illustrated in FIGS. 15 and 16, the diffraction peak generated between the reference element 32A and one adjacent peripheral element 32C is superimposed on the diffraction valley generated between the reference element 32A and the other adjacent peripheral elements 32B, 32D, 32E, and 32F. FIGS. 15(a) to 15(e) respectively correspond to FIGS. 16(a) to 16(e). FIGS. 15, 16, and 17 (to be described later) illustrate only a case of Expression 3 with regard to δ1 and only a case of Expression 6 with regard to δ3. However, the same result is also obtained in a case of Expression 4 with regard to δ1 and in a case of Expression 7 with regard to δ3.

According to the above-described configuration, if the diffracted light generated between the reference element 32A and the adjacent peripheral elements 32B, 32C, 32D, 32E, and 32F is superimposed as illustrated in FIG. 15(f) in each of the array directions x and y, the intensity distribution illustrated in FIG. 17 is obtained. Here, in the intensity distribution in FIG. 17 which relates to any one of the array directions x and y, the diffracted light respectively generated between the reference element 32A and the adjacent peripheral elements 32B, 32C, 32D, 32E, and 32F is illustrated by a two-dot chain line graph, and a superimposed result of the diffracted light is illustrated by a solid line graph. As is understood from the intensity distribution, the intensity difference I between the intensity at the emission angle θ of the centers of the respective diffraction peaks and the intensity at the emission angle θ between the centers may become small as much as possible. Therefore, a viewer who views the diffracted light as the virtual image 70 is less likely to feel a luminance irregularity in accordance with the decreased intensity difference I.

(Operation Effect)

An operation effect according to this embodiment described above will be described below.

In this embodiment, the optical elements 32 adjacent to each other respectively project the laser beam from the curved surface 33 of the surface having the common convexly curved shape. Accordingly, the diffraction peaks of multiple orders in accordance with the emission angle θ are generated in the intensity distribution of the diffracted light generated by interference of the emitted light. However, the offset amounts δi generated by forming the surface vertexes 34 of the curved surface 33 to be offset from each other in a stepwise manner are different from each other in the respective optical elements 32 between the optical elements 32 adjacent to each other. Accordingly, the diffraction peak of the diffracted light is generated around the emission angle θ in accordance with the step amount δi.

Therefore, according to this embodiment, the respective reference elements 32A which are the optical elements 32 serving as the reference have mutually different offset amounts δi between the reference element 32A and the peripheral elements 32B, 32C, 32D, 32E, and 32F which are the optical elements 32 adjacent to the reference element 32A. In this manner, the diffraction peaks of the diffracted light generated between the reference element 32A and the respective adjacent peripheral elements 32B, 32C, 32D, 32E, and 32F can be offset from each other in accordance with the mutually different offset amounts δi. Accordingly, a luminance irregularity felt by a viewer who views the diffracted light as a virtual image can be suppressed.

In the respective directions x and y in which the reference element 32A and the peripheral elements 32B, 32C, 32D, 32E, and 32F according to this embodiment are alternately two-dimensionally arrayed, a pair of the reference element 32A and any one of the peripheral elements 32B, 32C, 32D, 32E, and 32F, which are adjacent to each other, forms each element pair set Pi. The plurality of different types of the element pair sets Pi having different offset amounts δi between the pairs of the reference element 32A and the respective peripheral elements 32B, 32C, 32D, 32E, and 32F are arranged in the fixed order in each of the array directions x and y. In this manner, the reference element 32A of the respective element pair sets Pi in each of the array directions x and y can generate the mutually different offset amounts δi between the reference element 32A and any one of the peripheral elements 32B, 32C, 32D, 32E, and 32F forming the same element pair set Pi and between the reference element 32A and any one of the peripheral elements 32B, 32C, 32D, 32E, and 32F forming another adjacent element pair set Pi. Therefore, with regard to the diffracted light generated between the reference element 32A and the respective adjacent peripheral elements 32B, 32C, 32D, 32E, and 32F, an effect of shifting the diffraction peak in accordance with the mutually different offset amounts δi can be obtained across an entire area of two-dimensional array.

Moreover, in each of the array directions x and y in which the arrangement order is fixed, the peripheral elements 32B, 32C, 32D, 32E, and 32F of the respective element pair sets Pi can generate the common offset amount δi between the peripheral elements 32B, 32C, 32D, 32E, and 32F and the reference element 32A forming the same element pair set Pi and between the peripheral elements 32B, 32C, 32D, 32E, and 32F and the reference element 32A forming another adjacent element pair set Pi. In this manner, as the peripheral elements in which the diffraction peaks of the diffracted light generated between the peripheral elements and the adjacent reference elements 32A on both sides are offset from each other, at least the elements 32B, 32C, and 32D can exist in any one of the array directions x and y.

As described above, according to the effect of shifting the diffraction peak viewed around the reference element 32A and the effect of shifting the diffraction peak viewed around the peripheral elements 32B, 32C, and 32D, an advantageous effect of suppressing a luminance irregularity can be enhanced.

Furthermore, according to the first to fifth element pair sets Pi in this embodiment, the diffraction peaks of the diffracted light generated between the reference element 32A and the peripheral elements 32B, 32C, 32D, 32E, and 32F are offset by each amount of $\lambda/16\pm\epsilon$. As a result, in the intensity distribution where the diffracted light is superimposed in each of the array directions x and y, the intensity difference I between the intensity at the emission angle θ of the centers of the respective diffraction peaks offset by the amount of $\lambda/16\pm\epsilon$, and the intensity at the emission angle θ between the centers can decrease as much as possible. Therefore, an advantageous effect of suppressing a luminance irregularity felt by a viewer due to the intensity difference I of the diffracted light can be enhanced.

Furthermore, according to this embodiment, when the peak wavelength of the green laser beam appearing in the range of 490 nm to 530 nm within the laser beams of multiple colors, that is, the peak wavelength of the laser beam which allows high visibility is set to λ in Expressions 3 to 9 and 12, the diffraction peaks with regard to the wavelength can be offset from each other. In this case, a luminance irregularity can be suppressed in colors which a viewer is likely to feel. According to this embodiment, when the peak wavelength of the red laser beam appearing in the range of 600 nm to 650 nm within the laser beams of multiple colors, that is, the peak wavelength of the laser beam which allows a large diffraction angle is set to λ in Expressions 3 to 9 and 12, the diffraction peaks with regard to the wavelength can be offset from each other. In this case, a luminance irregularity can be suppressed in colors which are more noticeable when the diffraction angle is large According to the respective reference elements 32A in this embodiment, the linear boundary 35 is interposed between the reference element 32A and the respective adjacent peripheral elements 32B, 32C, 32D, 32E, and 32F to generate the mutually different sag amounts SAi in accordance with the offset amounts δi. According to this configuration, the linear boundary 35 can suppress incident light loss or occurrence of ghost superimposition caused by laser beam diffraction in the boundary 35. The mutually different offset amounts δi can suppress a luminance irregularity felt by a viewer.

According to this embodiment, the peripheral elements 32B, 32C, 32D, 32E, and 32F which are adjacent to the respective reference elements 32A respectively have the peak pitch d common to the adjacent reference elements 32A, and the mutually different sag amounts SB, SC, SD, SE, and SF. In this manner, the mutually different sag amounts SAi in accordance with the offset amounts δi can be generated in the respective reference elements 32A through the linear boundary 35. As a result, a structure for providing the mutually different offset amounts δi can be simplified by setting the same peak pitch d. The mutually different offset amounts δi can suppress a luminance irregularity felt by a viewer.

Other Embodiments

Hitherto, an embodiment of this disclosure has been described. However, this disclosure is not construed as limited to the embodiment, and can be applied to various embodiments within the scope not departing from the gist of this disclosure.

Figure 18:
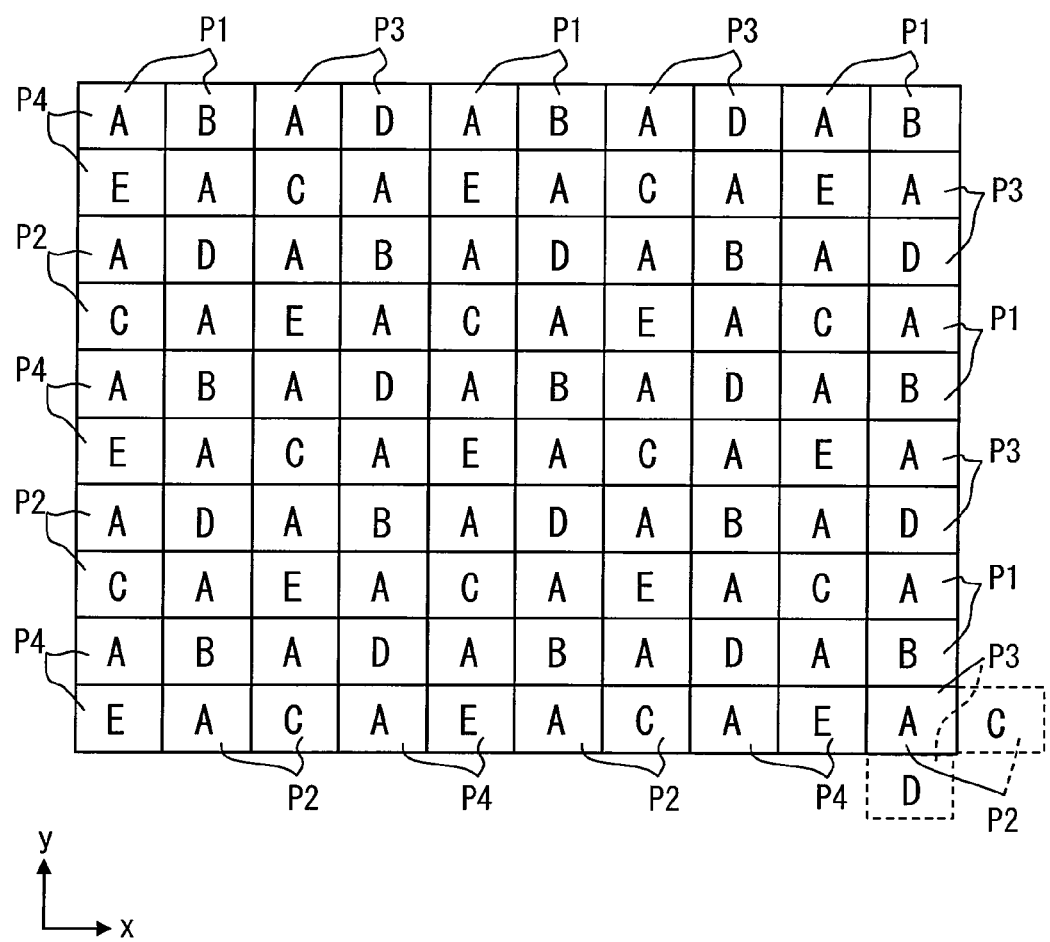
FIG. 18 is a schematic view illustrating a modification example in FIG. 12.

Specifically, in a first modification example, as illustrated in FIG. 18, any one (the peripheral element 32F in the example in FIG. 18) of the peripheral elements 32B, 32C, 32D, 32E, and 32F may be provided in a screen member 30. In this case, a offset amount δi between the element provided in the screen member 30 within the peripheral elements 32B, 32C, 32D, 32E, and 32F and a reference element 32A may satisfy or may not satisfy the corresponding expression within Expressions 3 to 9. However, even in this case, the offset amounts are required to be different from each other between the respective reference elements 32A and the adjacent peripheral elements.

In a second modification example, although not illustrated, another peripheral element may also be provided in a screen member 30 in addition to peripheral elements 32B, 32C, 32D, 32E, and 32F. In this case, a offset amount δi between the peripheral elements 32B, 32C, 32D, 32E, and 32F and a reference element 32A may satisfy or may not satisfy Expressions 3 to 9. However, even in this case, the offset amounts are required to be different from each other between the respective reference elements 32A and the respective adjacent peripheral elements which include the elements 32B, 32C, 32D, 32E, and 32F and the additional element.

In a third modification example, as illustrated in FIG. 18, an arrangement order of the element pair sets may be changed for each column along respective array directions x and y, instead of fixing the arrangement order in each of the array directions x and y. For example, in FIG. 18, a column in which a first element pair set P1 and a third element pair set P3 are alternately arrayed and a column in which a second element pair set P2 and a fourth element pair set P4 are alternately arrayed are provided along the respective array directions x and y.

Figure 19:
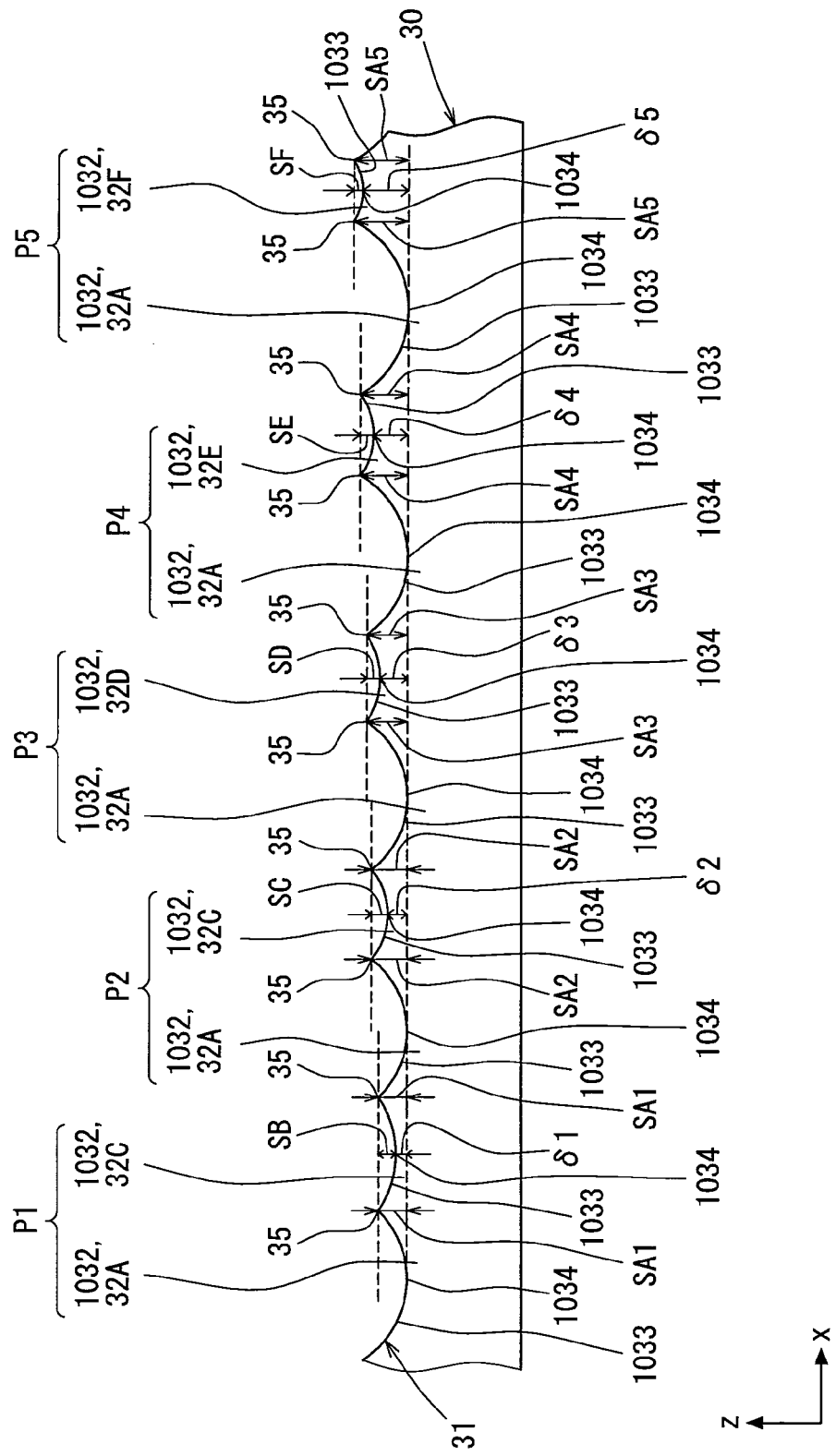
FIG. 19 is a schematic view illustrating a modification example in FIG. 6.

In a fourth modification example, instead of a curved surface 33 having a convex and curved shape which is convexly curved, a curved surface 1033 having a concave and curved shape which is concavely curved, such as an arcuate concave shape as illustrated in FIG. 19, may be provided on a surface of an optical element 1032. In this case, the curved surface 1033 on the surface of each optical element 1032 is recessed toward a side opposite to a laser scanner 10 and an optical system 40 in a direction z orthogonal to directions x and y, and the most recessed point is set to be a surface vertex 1034. As illustrated in FIG. 19, configurations other than the above-described configurations used in the fourth modification example are the same as those in the previously described embodiment.

Figure 20:
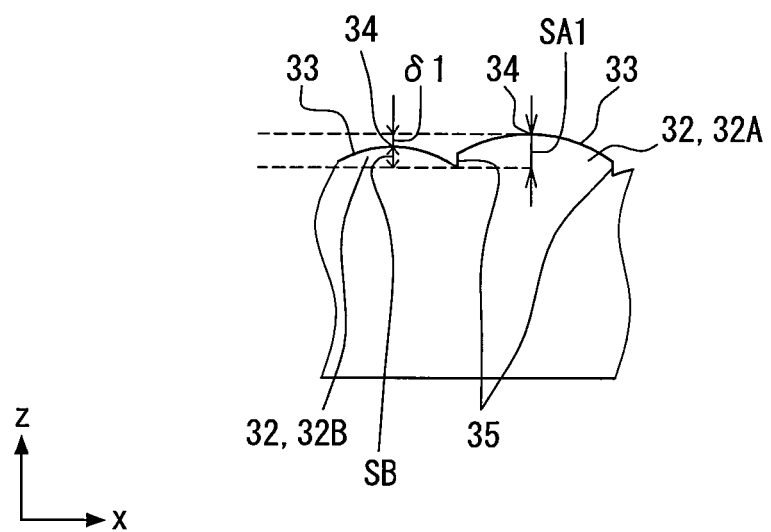
FIG. 20 is a schematic view illustrating a modification example in FIG. 6.

In a fifth modification example, curved surfaces 33 and 1033 which allow a laser beam projected on a scanning surface 31 to be transmitted therethrough so as to diffuse and emit the laser beam may be provided on a surface of optical elements 32 and 1032 serving as a micro lens. In a sixth modification example, as illustrated in FIG. 20, a reference element 32A and respective peripheral elements 32B, 32C, 32D, 32E, and 32F may be adjacent to each other via a boundary 35 having a stepped shape. In this case, sag amounts between the peripheral elements with respect to the reference element 32A may be different from each other, or may be the same.

In a seventh modification example, mutually different radii of curvature in a horizontal direction x and a vertical direction y may be set for the same optical elements 32 and 1032. Furthermore, in an eighth modification example, mutually different radii of curvature may be set for optical elements 32 and 1032 which are adjacent to each other.

In a ninth modification example, one scanning mirror which is rotatable around two axes may be used as MEMS 26 of a laser scanner 10 which is a "projector". In a tenth modification example, an element other than a windshield 90 may be used for a "display member" which provides a projection surface 91 of a vehicle 1. Alternatively, for example, a combiner which is attached to an interior side surface of the windshield 90 or which is provided separately from the windshield 90 may be used. Furthermore, in an eleventh modification example, this disclosure may be applied to various moving bodies (transportation vehicles) such as ships or airplanes other than the vehicle 1.

What is claimed is:

1. A head-up display device that displays a virtual image of a display image to be visible from an interior of a moving body by projecting the display image onto a projection surface of the moving body, the device comprising:
 a projector that projects a laser beam of the display image; and
 a screen member that includes a plurality of optical elements arrayed in a lattice pattern, the screen member guiding the laser beam toward the projection surface by diffusing the laser beam incident on the optical elements from the projector, wherein
 each of the plurality of optical elements has a curved surface on one side thereof, the curved surface having a common curved shape of one of a convex curve and a concave curve, the curved surface diffusing the laser beam emitted from the curved surface toward the projection surface,
 the plurality of optical elements include a plurality of reference elements that serve as a reference and a plurality of peripheral element adjacent to the plurality of reference elements,
 the curved surface of each of the plurality of reference elements has a surface vertex that is offset from a surface vertex of each of the adjacent plurality of peripheral elements, and
 each of the plurality of reference elements has a different offset amount with each of the adjacent plurality of peripheral elements.

2. The head-up display device according to claim 1, wherein:
 the plurality of reference elements and the plurality of peripheral elements are alternately two-dimensionally arrayed along array directions, mutually adjacent ones of the plurality of reference elements and the plurality of peripheral elements along each of the array directions forming element pair sets, and
 a plurality of different types of the element pair sets are arranged in a fixed order along each of the array directions, the offset amount between the pair of the reference element and the peripheral element being different for each type of the element pair sets.

3. The head-up display device according to claim 2, wherein
 each of the plurality of optical elements diffuses and emits the laser beam by reflecting the laser beam on the curved surface,
 jp, Ip, and n are defined as an integer of 0 or more,
 jm and Im are defined as an integer of 1 or more,
 k and m are defined as an odd number of 1 or more,
 a wavelength of the laser beam is defined as $\lambda$,
 $\epsilon 1, \epsilon 2, \epsilon 3, \epsilon 4$, and $\epsilon 5$ are defined as numerical values that meet a condition that the numerical values are greater than $-\lambda/32$ and less than $\lambda/32$, and
 the plurality of different types of the element pair sets include:
  a first element pair set having the offset amount between the pair of the reference element and the peripheral element, the offset amount being represented by an expression $\{(8jp+1)/16\}*\lambda+\epsilon 1$ or an expression $\{(8jm-1)/16\}*\lambda+\epsilon 1$;
  a second element pair set having the offset amount between the pair of the reference element and the peripheral element, the offset amount being represented by an expression $(k/8)*\lambda+\epsilon 2$;
  a third element pair set having the offset amount between the pair of the reference element and the peripheral element, the offset amount being represented by an expression $\{(8Ip+3)/16\}*\lambda+\epsilon 3$ or an expression $\{(8Im-3)/16\}*\lambda+\epsilon 3$;
  a fourth element pair set having the offset amount between the pair of the reference element and the peripheral element, the offset amount being represented by an expression $(m/4)*\lambda+\epsilon 4$; and
  a fifth element pair set having the offset amount between the pair of the reference element and the peripheral element, the offset amount being represented by an expression $(n/2)*\lambda+\epsilon 5$.

4. The head-up display device according to claim 3, wherein
 the projector projects the laser beam of a plurality of colors including a green laser beam that appears in a range of a peak wavelength of 490 nm to 530 nm, and
 $\lambda$ is set to the peak wavelength of the green laser beam.

5. The head-up display device according to claim 3, wherein
the projector projects the laser beam of a plurality of colors including a red laser beam that appears in a range of a peak wavelength of 600 nm to 650 nm, and
$\lambda$ is set to the peak wavelength of the red laser beam.

6. The head-up display device according to claim 1, wherein
each of the plurality of reference elements has different sag amounts between the surface vertex thereof and each of the adjacent plurality of peripheral elements that is adjacent to the each of the plurality of reference elements through a linear boundary, and
the different sag amounts vary according to the offset amount for a corresponding one of the plurality of reference elements.

7. The head-up display device according to claim 6, wherein
each of the plurality of reference elements has a same peak pitch with the adjacent plurality of peripheral elements, and
each of the adjacent plurality of peripheral elements has a different sag amount.

* * * * *